US008766497B2

(12) United States Patent
Goto et al.

(10) Patent No.: US 8,766,497 B2
(45) Date of Patent: Jul. 1, 2014

(54) ROTATING ELECTRICAL MACHINE

(75) Inventors: Kazuhiro Goto, Toyota (JP); Yasuhiro Endo, Okazaki (JP); Tomoka Sonohara, Toyota (JP); Tomohiko Miyamoto, Toyota (JP); Masao Okumura, Chiryu (JP); Atomi Arakawa, Anjo (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 239 days.

(21) Appl. No.: 13/128,314

(22) PCT Filed: Nov. 20, 2009

(86) PCT No.: PCT/IB2009/007532
§ 371 (c)(1),
(2), (4) Date: May 9, 2011

(87) PCT Pub. No.: WO2010/058284
PCT Pub. Date: May 27, 2010

(65) Prior Publication Data
US 2011/0215660 A1    Sep. 8, 2011

(30) Foreign Application Priority Data

Nov. 21, 2008  (JP) ................................. 2008-298481

(51) Int. Cl.
*H02K 9/00*    (2006.01)
(52) U.S. Cl.
USPC .................................. 310/53; 310/54; 310/71
(58) Field of Classification Search
CPC ....................................................... H02K 9/19
USPC ........................................... 310/50–59, 60 R
See application file for complete search history.

(56) References Cited

U.S. PATENT DOCUMENTS 4,753,284 A * 6/1988 Krause et al. ................. 165/11.1
5,718,302 A * 2/1998 Hasebe et al. ................ 180/65.6
(Continued)

FOREIGN PATENT DOCUMENTS

JP    55-051698 U    4/1980
JP    08-250881 A    9/1996
(Continued)

OTHER PUBLICATIONS

International Search Report and Written Opinion for corresponding International Patent Application No. PCT/IB2009/007532 mailed Aug. 26, 2010.

(Continued)

*Primary Examiner* — John K Kim
*Assistant Examiner* — Thomas Truong
(74) *Attorney, Agent, or Firm* — Sughrue Mion, PLLC

(57) ABSTRACT

A motor-generator which is a rotating electrical machine is provided with a coil end cover and a plurality of connecting wires. The coil end cover forms a cooling oil passage around a coil end portion and a cooling oil passage around a coil end portion, and a cooling oil communicating passage that communicates the cooling oil passage with the cooling oil passage on the inside of the stator core. The plurality of connecting wires are provided in the cooling oil passage. The direction in which the cooling oil flows in the cooling oil passage is the same as the direction in which the connecting wires extend at an angle from the radial outside to the radial inside of the stator core. The flowrate of cooling oil in the cooling oil passage is set larger than the flowrate of cooling oil in the cooling oil passage.

6 Claims, 23 Drawing Sheets

(56) References Cited

U.S. PATENT DOCUMENTS

| | | | |
|---|---|---|---|
| 5,744,880 A | 4/1998 | Kudoh et al. | |
| 5,994,804 A * | 11/1999 | Grennan et al. | 310/60 R |
| 6,515,384 B1 * | 2/2003 | Kikuchi et al. | 310/58 |
| 7,215,048 B2 * | 5/2007 | Du et al. | 310/43 |
| 2002/0074871 A1 | 6/2002 | Kikuchi et al. | |
| 2005/0151429 A1 * | 7/2005 | Taketsuna et al. | 310/54 |
| 2006/0043801 A1 * | 3/2006 | Adra | 310/54 |
| 2007/0273228 A1 * | 11/2007 | Tanaka et al. | 310/90 |

FOREIGN PATENT DOCUMENTS

| | | |
|---|---|---|
| JP | 09-009561 A | 1/1997 |
| JP | 2002-186205 A | 6/2002 |
| JP | 2005-117845 A | 4/2005 |
| JP | 2005-261084 A | 9/2005 |
| JP | 2006-033916 A | 2/2006 |
| JP | 2007-295698 A | 11/2007 |
| JP | 2007295698 A * | 11/2007 |
| WO | 2004/019468 A1 | 3/2004 |

OTHER PUBLICATIONS

Japanese Office Action for corresponding Japanese Patent Application No. 2008-298481 drafted on Oct. 29, 2010.

* cited by examiner

F I G. 37
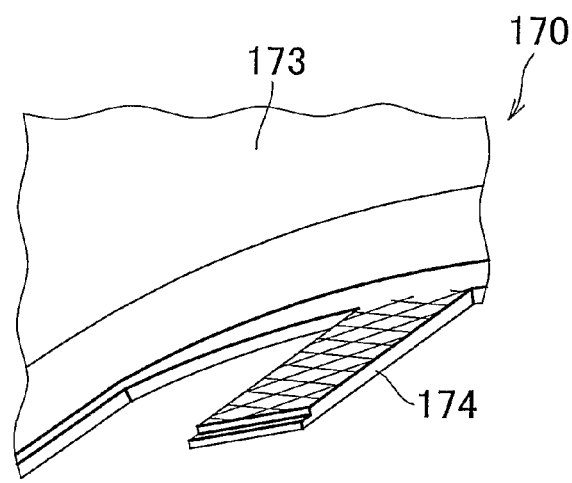
F I G. 38
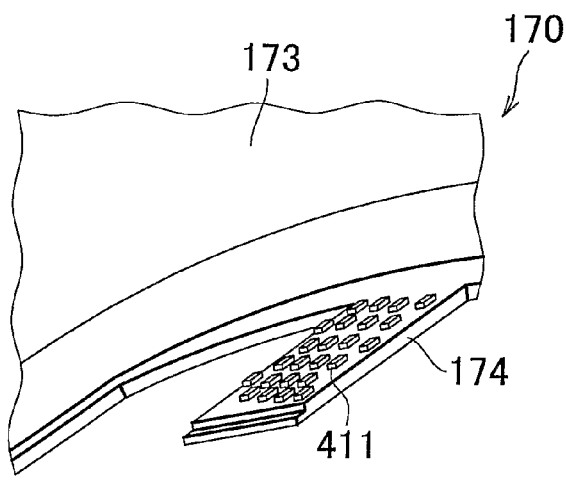
F I G. 39
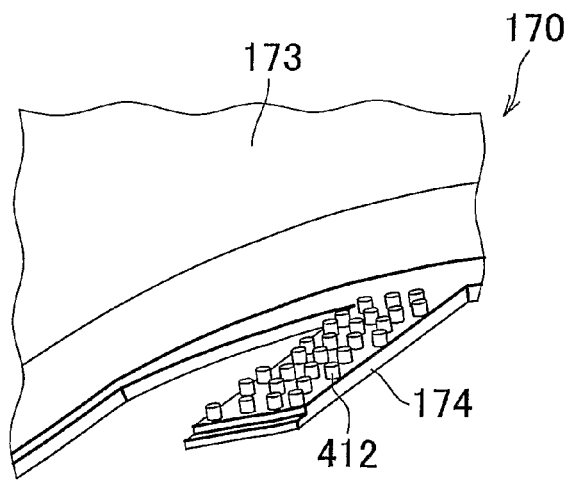

F I G . 40
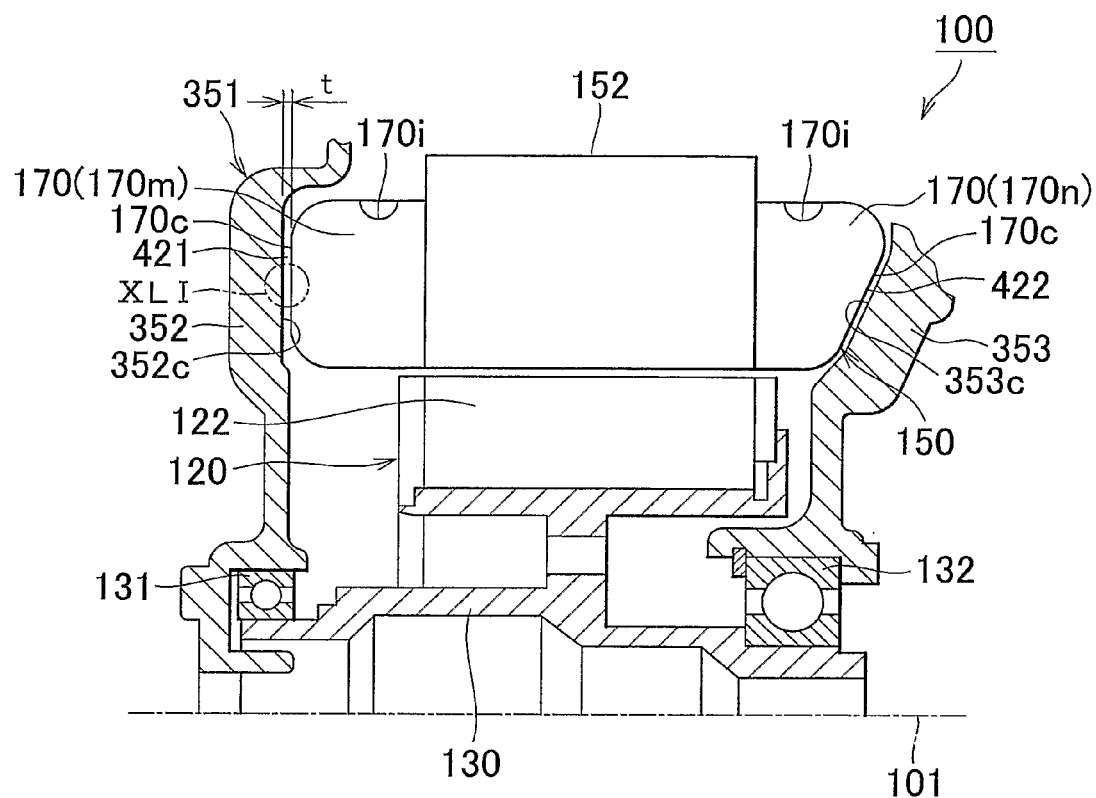
F I G . 41
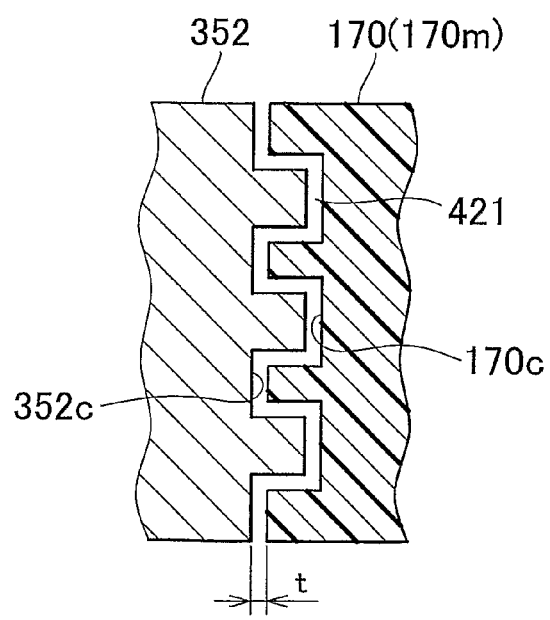

F I G . 42
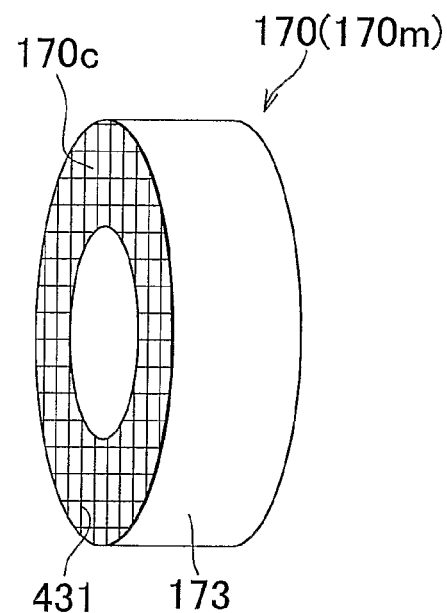
F I G . 43
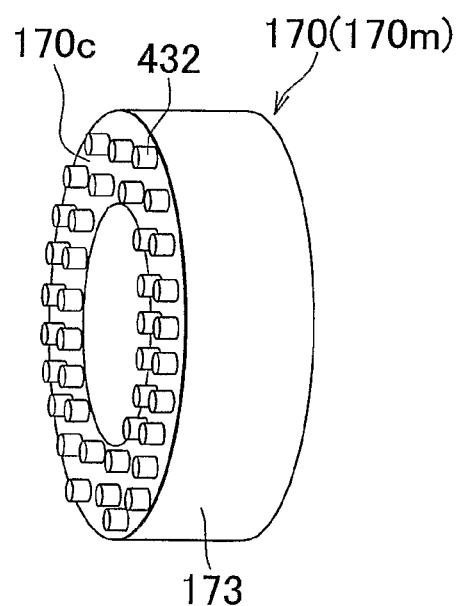

ROTATING ELECTRICAL MACHINE

The disclosure of Japanese Patent Application No. 2008-298481 filed on Nov. 21, 2008, including the specification, drawings and abstract is incorporated herein by reference in its entirety.

BACKGROUND OF THE INVENTION

1. Field of the Invention

The invention generally relates to a rotating electrical machine, and more particularly, a rotating electrical machine having a structure for cooling a coil end portion.

2. Description of the Related Art

International Publication Number WO 2004/19468 describes a related rotating electrical machine which is a vehicle motor that aims to efficiently cool a stator that generates heat from a coil.

In the vehicle motor described in International Publication Number WO 2004/19468, the stator is covered by a coil end cover that surrounds both end surfaces of the coil and the stator core. Cooling oil supplied by an oil pump is filled inside the coil end cover. Further, this vehicle motor has cooling passages that communicate the coil end cover that surrounds one end surface of the stator core with the coil end cover that surrounds the other end side of the stator core to enable coolant to contact the stator windings.

Also, Japanese Patent Application Publication No. 2005-261084 (JP-A-2005-261084) describes a motor cooling structure that aims to improve cooling efficiency. The motor cooling structure described in JP-A-2005-261084 has i) a circumferential cooling passage that is formed on both ends in the axial direction of the stator so that coolant directly contacts a portion of the coil end, and ii) an axial cooling passage that is formed in the axial direction of the stator and communicates the circumferential cooling passages on both ends of the stator.

Also, Japanese Patent Application Publication No. 8-250881 (JP-A-8-250881) describes a cooling structure of a heat-generating component that aims to uniformly and efficiently cool that heat-generating component, regardless of where that heat-generating component is mounted. The cooling structure of the heat-generating component described in JP-A-8-250881 is provided with a turbulence promoting portion (a metal block body) on a portion facing the heat-generating component. In this turbulence promoting portion, coolant collides with a turbulence promoting member which creates turbulence that enables the heat-generating component, which is arranged directly below the turbulence promoting portion, to be uniformly cooled.

Also, Japanese Patent Application Publication No. 2007-295698 (JP-A-2007-295698) describes a stator of a rotating electrical machine that aims to obtain sufficient joint strength without melting an insulating member. In the rotating electrical machine described in JP-A-2007-295698, the end portion of a coil wound around the teeth of a stator core and the end portion of a coil wound around other teeth are connected together by a bus bar.

Moreover, Japanese Patent Application Publication No. 2005-117845 (JP-A-2005-117845) describes a rotating electrical machine cooling apparatus that aims to efficiently cool a rotating electrical machine mounted in a vehicle using a cooling medium, while maintaining the durability of that cooling medium. In the rotating electrical machine cooling apparatus described in JP-A-2005-117845, a cooling oil dripping portion for dripping cooling oil on a stator is provided in a housing that houses the stator.

In the vehicle motor described in International Publication Number WO 2004/19468, a cooling passage for supplying coolant so that the coolant contacts the stator winding is formed radially inward of the stator core. However, when oil supplied inside the coil end cover is unable to smoothly flow from one end surface of the stator core to the cooling passage, the cooling efficiency of the coil may not be able to be sufficiently improved.

SUMMARY OF THE INVENTION

Therefore, in view of these problems, the invention provides a rotating electrical machine in which the coil is able to be efficiently cooled.

One aspect of the invention relates to a rotating electrical machine that includes an annular stator core, a coil, a cover body, and a plurality of connecting wires. The coil is wound around the stator core and includes a first coil end portion that protrudes from one end surface of the stator core and a second coil end portion that protrudes from the other end surface of the stator core. The cover body forms a first coolant passage around the first coil end portion and a second coolant passage around the second coil end portion. Furthermore, the cover body forms a gap that communicates the first coolant passage with the second coolant passage on the inside of the stator core. The plurality of connecting wires are provided in the first coolant passage. Each of the connecting wires extends at an angle from the radial outside of the stator core to the radial inside of the stator core, when viewed from the axial direction of the stator core, and connects a beginning of the coil to an end of the coil. The direction in which coolant flows through the first coolant passage is the same as the direction in which the plurality of connecting wires extend at an angle from the radial outside of the stator core toward the radial inside of the stator core, in the circumferential direction of the stator core. The flowrate of coolant in the first coolant passage is set larger than the flowrate of coolant in the second coolant passage.

According to the rotating electrical machine having this kind of structure, providing a difference in the coolant flowrate between the first coolant passage and the second coolant passage enables coolant to be forced from the first coolant passage to the second coolant passage through the gap. Also, the cooling oil that flows through the first coolant passage is able to be guided smoothly to the gap in the stator core through the space between adjacent connecting wires by having the direction in which the cooling oil flows in the first coolant passage be the same as the direction in which the connecting wires extend at an angle from the radial outside of the stator core to the radial inside of the stator core in the circumferential direction of the stator core. The synergistic effect of these structures in this invention makes it possible to more actively pass coolant through the gap inside the stator core, and thus efficiently cool the coil.

Also, a wall surface of the cover body that defines the gap may have a concavo-convex shape. According to the rotating electrical machine having this kind of structure, the concavo-convex shape formed on the wall surface generates turbulence in the flow of coolant flowing through the gap. As a result, the coil can be cooled even more efficiently.

Also, the cover body may be formed of resin and have the concavo-convex shape molded on the wall surface. According to the rotating electrical machine having this kind of structure, the concavo-convex shape is easily able to be formed on the wall surface of the cover body.

Also, a mesh member may be arranged on a wall surface of the cover body that defines the gap. According to the rotating electrical machine having this kind of structure, the mesh member on the wall surfaces generates turbulence in the flow of coolant that passes through the gap. As a result, the coil can be cooled even more efficiently. Further, the cover body may be formed of resin and have a mesh shape molded on the wall surface. According to the rotating electrical machine having this kind of structure, the mesh shape is easily able to be formed on the wall surface of the cover body.

Also, each of the connecting wires may have a generally rectangular cross section such that if cut along a plane orthogonal to the direction in which the connecting wire extends, the long side of the connecting wire extends in the axial direction of the stator core and the short side of the connecting wire extends in the direction orthogonal to the axial direction of the stator core. According to the rotating electrical machine having this kind of structure, the amount of coolant led to the gap inside the stator core through the space between adjacent connecting wires can be increased.

Another aspect of the invention relates to a rotating electrical machine that includes a stator core, a coil, a cover body, and a case body that houses the stator core. The coil is wound around the stator core and includes a coil end portion that protrudes from an end surface of the stator core. The cover body forms a coolant passage around the coil end portion; and includes a coolant discharge portion for discharging coolant from the coolant passage. The case body is arranged so as to form a narrow space through which coolant is able to flow between the case body and the cover body. A wall surface of at least one of the case body or the cover body that defines the narrow space has a concavo-convex shape or on which a mesh member is arranged.

According to the rotating electrical body having this kind of structure, providing the narrow space between the case body and the cover body increases the length of time for which the coolant that has been discharged from the coolant passage through the coolant discharge portion is retained in that narrow space. Also, the wall surface of the case body and/or the cover body has a concavo-convex shape or a mesh member is arranged on the wall, surface, which increases the contact area between the coolant that flows through the narrow space and the case body and/or the cover body, as well as generates turbulence in the flow of coolant in the narrow space. As a result, heat conductivity from the cover body to the case body via the coolant improves, so the cooling efficiency of the coil is able to be improved.

As described above, the invention makes it possible to provide a rotating electrical machine in which the coil can be efficiently cooled.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIG. 37 is a perspective view of a coil end cover used in the cooling structure, according to a second modified example of the eleventh example embodiment, for the radial inside of the coil shown in FIG. 34;

FIG. 38 is a perspective view of a coil end cover used in the cooling structure, according to a third modified example of the eleventh example embodiment, for the radial inside of the coil shown in FIG. 34;

FIG. 39 is a perspective view of a coil end cover used in the cooling structure, according to a fourth modified example of the eleventh example embodiment, for the radial inside of the coil shown in FIG. 34;

FIG. 40 is a sectional view of a motor-generator according to a twelfth example embodiment of the invention;

FIG. 41 is an enlarged sectional view of the area encircled by the alternate long and two short dashes line XLI in FIG. 40;

FIG. 42 is a perspective view of the coil end cover shown in FIG. 41 according to a first modified example of the twelfth example embodiment; and FIG. 43 is a perspective view of the coil end cover shown in FIG. 41 according to a second modified example of the twelfth example embodiment.

DETAILED DESCRIPTION OF EMBODIMENTS

Figure 1:
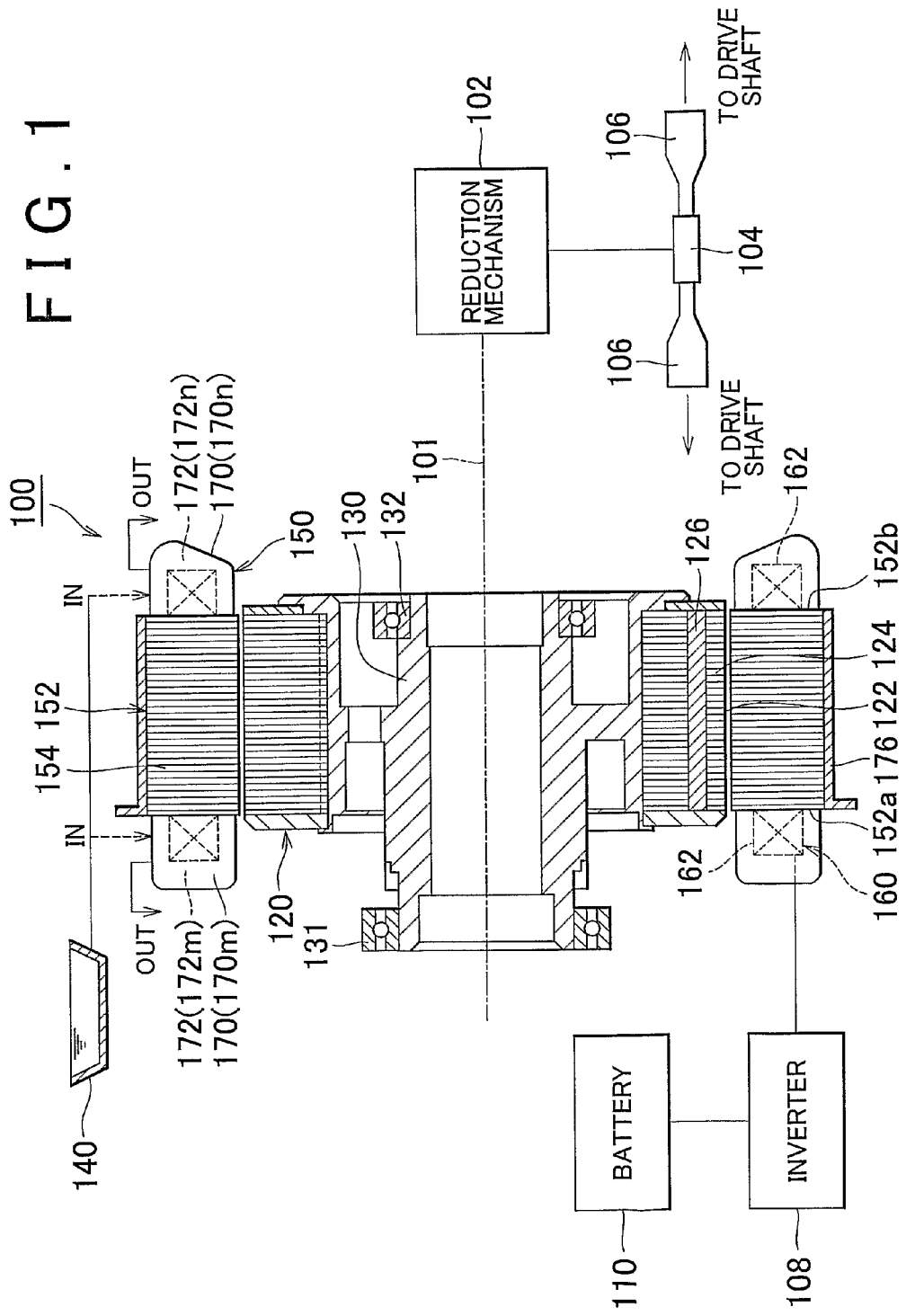
FIG. 1 is a sectional view showing a frame format of a vehicle drive unit provided with a motor-generator according to the example embodiments of the invention.

Example embodiments of the present invention will be described in greater detail below with reference to the accompanying drawings. Incidentally, like or corresponding members in the drawings will be denoted by like reference characters in the following description.

FIG. 1 is a sectional view showing a frame format of a vehicle drive unit provided with a motor-generator according to the example embodiments of the invention. The vehicle drive unit in the drawing is provided in a hybrid vehicle that uses an internal combustion engine such as a gasoline engine or a diesel engine and a motor that receives a supply of power from a secondary battery that can be charged and discharged, as power sources.

Referring to FIG. 1, the vehicle drive unit has a motor-generator 100. This motor-generator 100 is a rotating electrical machine that can function as either an electric motor or generator according to the running state of the hybrid vehicle.

The motor-generator 100 has a rotor 120, a rotor shaft 130, and a stator 150. The rotor 120 is formed integral with the rotor shaft 130 and rotates about a central axis 101 which is a virtual axis. The stator 150 is arranged on the outer periphery of the rotor 120.

The rotor shaft 130 extends in the axial direction of the central axis 101. The rotor shaft 130 is rotatably supported with respect to a motor case, not shown, via a bearing 131 and a bearing 132 provided separated from one another in the axial direction of the central axis 101. The rotor shaft 130 is connected to a reduction mechanism 102 that includes a plurality of gears.

The rotor 120 has a rotor core 122 and a permanent magnet 126. The rotor core 122 is shaped like a cylinder that extends in the axial direction of the central axis 101. The rotor core 122 is formed of a plurality of magnetic steel sheets 124 stacked in the axial direction of the central axis 101. A plurality of permanent magnets 126 are embedded in the rotor core 122. The plurality of permanent magnets 126 are provided at intervals from one another in the circumferential direction about the central axis 101.

Incidentally, the rotor 120 described above is an IPM (Interior Permanent Magnet) type of rotor in which the permanent magnets 126 are embedded in the rotor core 122. However, the invention is not limited to this. For example, the rotor 120 may also be an SPM (Surface Permanent Magnet) type of rotor in which magnets are affixed to the surface of the rotor.

The stator 150 has a stator core 152 and a coil 160. The stator core 152 is shaped like a cylinder that extends in the axial direction of the central axis 101. That is, the axial direction of the stator core 152 is the same as the axial direction of the central axis 101, the circumferential direction of the stator core 152 is the same as the circumferential direction around the central axis 101, and the radial direction of the stator core 152 is the same as the radial direction around the central core 101. The stator core 152 is formed of a plurality of magnetic steel sheets 154 stacked in the axial direction of the central axis 101. The stator core 152 has an end surface 152a at one end in the axial direction of the central axis 101 and an end surface 152b at the other end in the axial direction of the central axis 101.

The coil 160 is wound around the stator core 152. Coil end portions 162 of the coil 160 that is wound around the stator core 152 are formed by portions of the coil 160 that protrude from the end surfaces 152a and 152b.

The motor-generator 100 also has a coil end cover 170. This coil end cover 170 is formed of material that is both nonmagnetic and nonconductive. For example, the coil end cover 170 may be formed of resin such as PBT (polybutylene terephthalate), PPS (polyphenylene sulfide), or LCP (liquid crystal polymer). The coil end cover 170 is fixed to the stator core 152. Cooling oil passages 172 are formed around the coil end portions 162 by this coil end cover 170.

The coil end covers 170 is formed by a combination of a split coil end cover 170m and a split coil end cover 170n. The split coil end cover 170m is formed on the end surface 152a so as to cover the coil end portion 162. A cooling oil passage 172m is formed in the space surrounded by the end surface 152a and the split coil end cover 170m. The split coil end cover 170n is provided on the end surface 152b so as to cover the coil end portion 162. A cooling oil passage 172n is formed in the space surrounded by the end surface 152b and the split coil end cover 170n.

In this example embodiment, a catch tank 140 is arranged in a motor case, not shown. After oil picked up by a gear or the like collects in the catch tank 140, that oil is supplied from the catch tank 140 into the coil end cover 170 (i.e., the split coil end cover 170m and 170n).

Incidentally, the means for supplying oil to the coil end cover 170 is not limited to a structure that uses the catch tank 140 as shown in the drawing. For example, a pump may be used to forcibly supply oil to the coil end cover 170.

The coil 160 is electrically connected to a battery 110 via an inverter 108. The inverter 108 converts direct current from the battery 110 into alternating current for driving a motor, as well as converts alternating current generated from regenerative braking into direct current for charging the battery 110.

Power output from the motor-generator 100 is transmitted from the reduction mechanism 102 to drive shaft receiving portions 106 via a differential mechanism 104. The power transmitted to the drive shaft receiving portions 106 is then transmitted as rotational force to wheels, not shown, via drive shafts.

Meanwhile, during regenerative braking of the hybrid vehicle, the wheels are rotated by the inertia force of the vehicle body. This rotational force from the wheels is used to drive the motor-generator 100 via the drive shaft receiving portions 106, the differential mechanism 104, and the reduction mechanism 102. At this time, the motor-generator 100 operates as a generator, and the power generated by the motor-generator 100 is stored in the battery 110 via the inverter 108.

Figure 2:
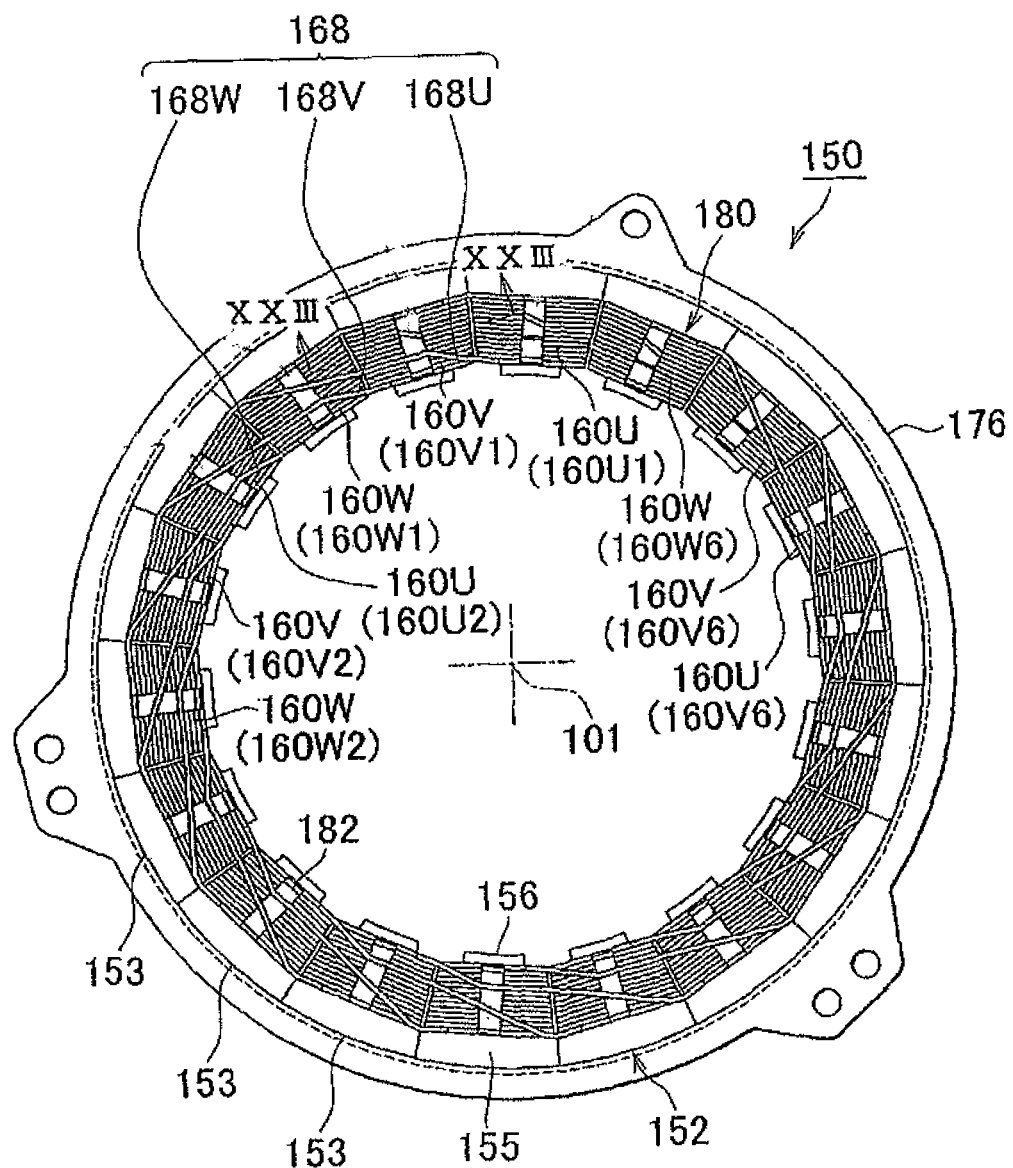
FIG. 2 is a view of a stator in FIG. 1 as viewed from the axial direction.

Next, the structure of the stator 150 in FIG. 1 will be described in greater detail. FIG. 2 is a view of the stator in FIG. 1 as viewed from the axial direction. In the drawing, the stator 150 is shown without the coil end cover 170 in FIG. 1 attached.

Referring to FIG. 2, the stator core 152 is formed of a plurality of split stator cores 153 that have been combined. The plurality of split stator cores 153 are arranged annularly around the central axis 101.

The motor-generator 100 also has a fastening ring 176 that is made of metal. The fastening ring 176 is fitted onto the outer periphery of the plurality of split stator cores 153 that have been arranged in a circle or ring shape. According to this kind of structure, the plurality of split stator cores 153 are integrally retained by the fastening ring 176.

One phase coil, from among U-phase coils 160U, V-phase coils 160V, and W-phase coils 160W, is mounted to each of the split stator cores 153. The U-phase coils 160U, the V-phase coils 160V, and the W-phase coils 160W are arranged in order in the circumferential direction of the stator core 152, such that the U-phase coils 160U are separated from one another, the V-phase coils 160V are separated from one another, and the W-phase coils 160W are separated from one another.

The motor-generator 100 also has connecting wires 168 for connecting the beginning of a particular phase coil to the end of another same-phase coil, for each of the U-phase coils 160U, the V-phase coils 160V, and the W-phase coils 160W. That is, adjacent U-phase coils 160U are connected together by a connecting wire 168U, adjacent V-phase coils 160V are connected together by a connecting wire 168V, and adjacent W-phase coils 160W are connected together by a connecting wire 168W.

The connecting wire 168U heads from the inner peripheral side of the stator core 152 toward the outer peripheral side of the stator core 152 as it extends from the end portion on the inner radial side of one U-phase coil 160U (160U1) toward another adjacent U-phase coil 160U (160U2) and connects to the end portion on the outer peripheral side of that other U-phase coil 160U (i.e., 160U2). In the same manner, the connecting wire 168V heads from the inner peripheral side of the stator core 152 toward the outer peripheral side of the stator core 152 as it extends from the end portion on the inner radial side of one V-phase coil 160V (160V1) toward another adjacent V-phase coil 160V (160V2) and connects to the end portion on the outer peripheral side of that other V-phase coil 160V (i.e., 160V2). Also, the connecting wire 168W heads from the inner peripheral side of the stator core 152 toward the outer peripheral side of the stator core 152 as it extends from the end portion on the inner radial side of one W-phase coil 160W (160W1) toward another adjacent W-phase coil 160W (160W2) and connects to the end portion on the outer peripheral side of that other W-phase coil 160W (i.e., 160W2).

In the motor-generator 100, the U-phase coil 160U, the V-phase coil 160V, and the W-phase coil 160W are arranged in order in the circumferential direction. Therefore, the connecting wire 168U, the connecting wire 168V, and the connecting wire 168W are arranged at intervals in the circumferential direction of the stator core 152. As a result, a space that extends in the circumferential direction of the stator core 152 while shifting in the radial direction of the stator core 152 is formed between adjacent connecting wires 152.

Neutral points are formed by the end portions of the V-phase coil 160V6, the U-phase coil 160UC, and the W-phase coil 160W6 that are positioned on the inner radial side of the stator coil 152 being connected together. Furthermore, external wires are connected to each of the end portions of the V-phase coil 160V1, the U-phase coil 160U1, and the W-phase coil 160W1 that are positioned on the outer radial side of the stator coil 152.

Incidentally, external wires may be connected to each of the end portions of the V-phase coil 160V6, the U-phase coil 160U6, and the W-phase coil 160W6 that are positioned on the inner radial side of the stator coil 152, while neutral points may be formed by the end portions of the V-phase coil 160V1, the U-phase coil 160U1, and the W-phase coil 160W1 that are positioned on the outer radial side of the stator coil 152 being connected together.

Figure 3:
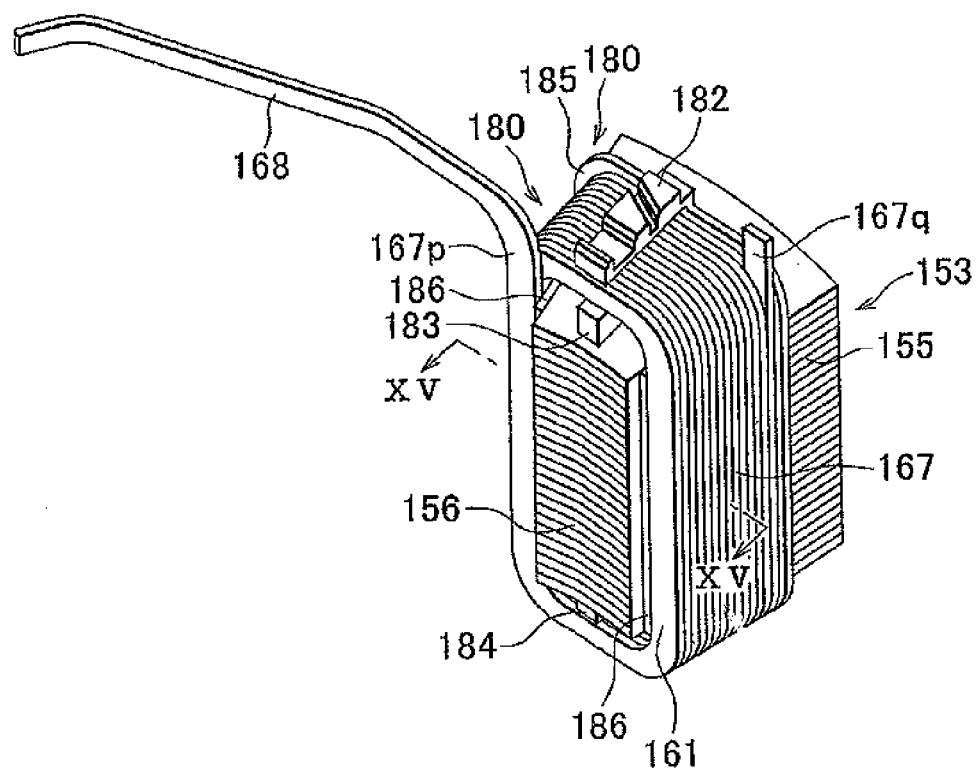
FIG. 3 is a perspective view of a split stator core unit in FIG. 2.
Figure 4:
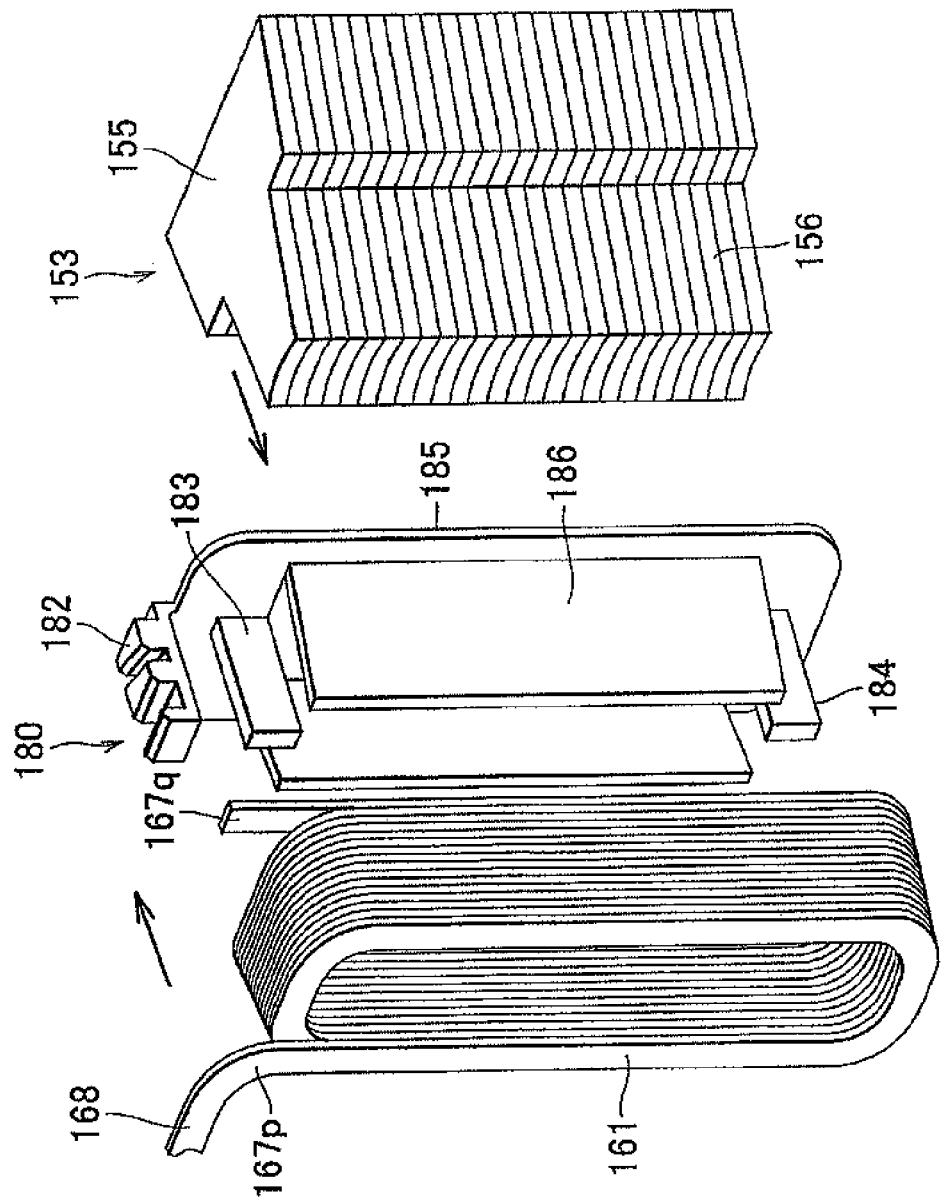
FIG. 4 is an exploded view of the split stator core unit in FIG. 2.

FIG. 3 is a perspective view of a unit of the split stator core in FIG. 2, and FIG. 4 is an exploded view of the unit of the split stator core in FIG. 2.

Referring to FIGS. 3 and 4, the split stator core 153 has a yoke portion 155 and a teeth portion 156. The yoke portion 155 has a curved shape that extends along in the circumferential direction of the stator core 152. The teeth portion 156 extends from the yoke portion 155 toward the radial inside of the stator core 152.

The motor-generator 100 also includes an insulator 180 that serves as an insulating member. The insulator 180 is formed of material that is both nonmagnetic and nonconductive, e.g., a resin such as PPS or LPC. The insulator 180 is attached to the outer periphery of the teeth portion 156 of the split stator core 153, and the coil 160 is attached to the outer periphery of the insulator 180. According to this kind of structure, the insulator 180 is interposed between the coil 160 and the stator core 152.

The insulator 180 has a teeth receiving portion 186, an extended portion 185, and protruding portions 183 and 184.

The teeth receiving portion 186 is shaped so that the teeth portion 156 is able to fit inside of it. The teeth receiving portion 186 is positioned between the teeth portion 156 and the coil 160. The extended portion 185 is formed flaring out from the edge portion of the teeth receiving portion 186 in a flange shape in both the circumferential direction and the axial direction of the stator core 152. The extended portion 185 is positioned between the yoke portion 155 and the coil 160. The protruding portions 183 and 184 are formed protruding toward the radial inside of the stator core 152 on both edges of the extended portion 185 in the axial direction of the stator core 152.

Each of the coils, i.e., the U-phase coil 160U, the V-phase coil 160V, and the W-phase coil 160W, (hereinafter simply referred to as "coils 160U, V, and W") are formed by winding and stacking the coil wire 161 in a circle. The coils 160U, V, and W are wound on the teeth portion 156 so that they circle around the teeth receiving portion 186 and the protruding portions 183 and 184 and stack in the radial direction of the stator core 152.

In this example embodiment, flat wire such as an edge width coil is used as the coil wire 161. This flat wire has a rectangular cross-section when cut along a plane orthogonal to the length direction. This cross-sectional shape is more rigid than a typical round coil wire. When an edge width coil is used as the coil wire 161, the short direction of the cross-section of the flat wire is the same as the winding direction of the coil wire 161 (i.e., the direction in which the teeth portion 156 extends) (i.e., when the coil wire 161 is wound around the teeth portion 156, the short side of the coil wire 161 bends).

Incidentally, the invention is not limited to flat wire. For example, typical round coil wire may also be used as the coil wire 161.

One end of each of the connecting wires 168 is connected to one end 167p of one of the coils 160U, V, or W that is the end of the coil wire 161 that is wound in a circle. When an edge width coil is used as the coil wire 161, the sectional shape of the connecting wires 168 such that the length in the axial direction of the stator, core 152 is longer than the length in the radial direction of the stator core 152. The connecting wires 168 that are connected to the other coils 160U, V, and W are connected to the other ends 167q of the corresponding coils 160U, V, and W.

The motor-generator 100 also has a connecting wire supporting portion 182. In this example embodiment, the connecting wire supporting portion 182 is integrally formed with the insulator 180. A plurality of grooves are formed in this connecting wire supporting portion 182, and the connecting wires 168 are supported on the end surface of the stator core 152 by fitting in these grooves.

Incidentally, the connecting wire supporting portion 182 is not limited to being integrally formed with the insulator 180. Alternatively, it may be provided separate from the insulator 180.

Figure 5:
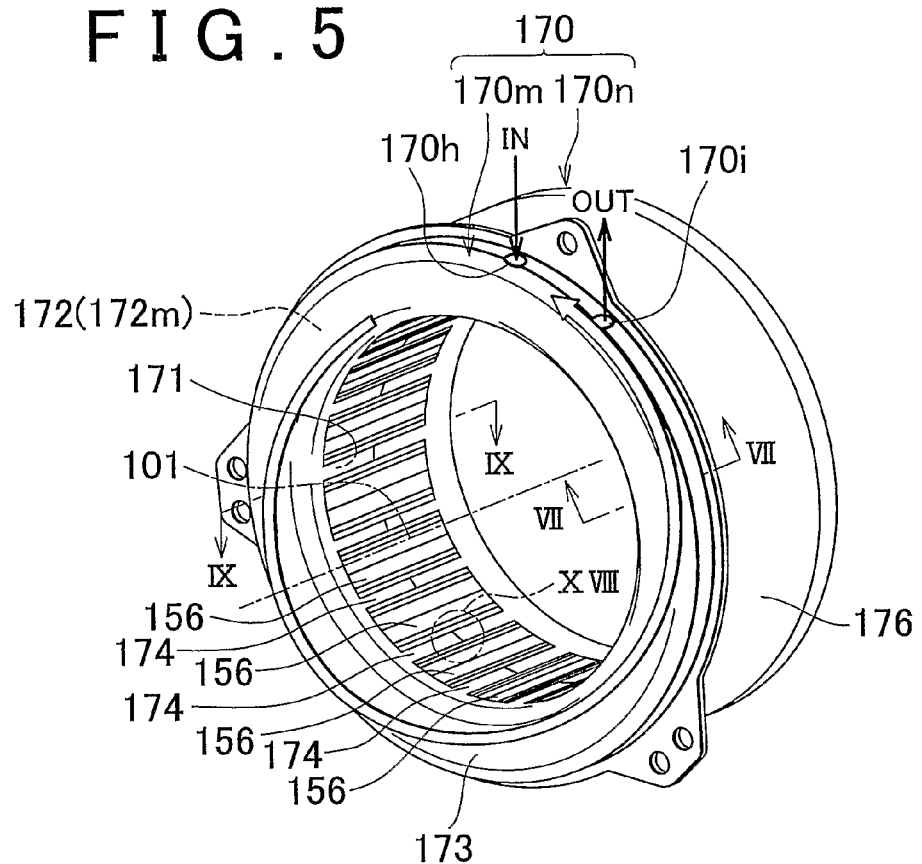
FIG. 5 is a perspective view of the stator in FIG. 1.

Next, the cooling structure of the stator 150 in FIG. 1 will be described in greater detail. FIG. 5 is a perspective view of the stator in FIG. 1, and FIG. 6 is a perspective view of the coil end cover provided on the stator in FIG. 1.

Figure 6:
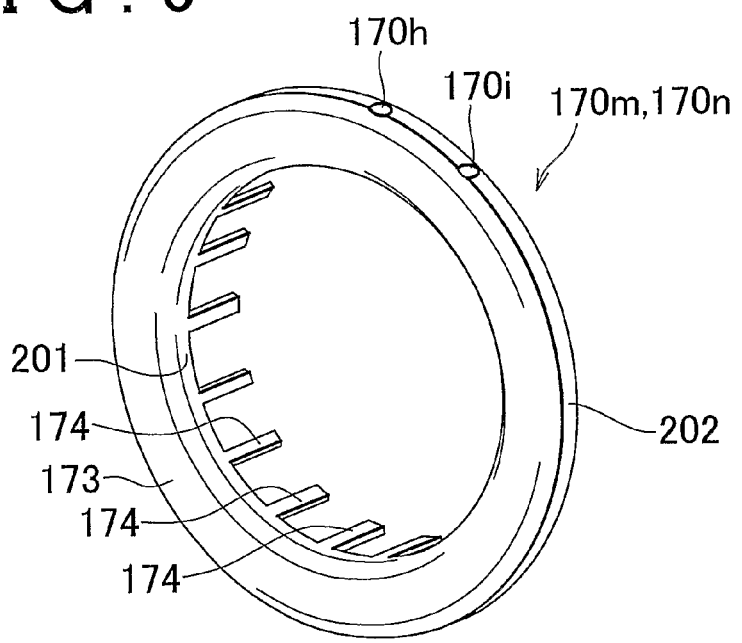
FIG. 6 is a perspective view of a coil end cover provided on the stator in FIG. 1.

Referring to FIGS. 1, 5, and 6, the split coil end covers 170m and 170n each have an annular portion 173 and a plurality of elongated portions 174.

These annular portions 173 are positioned on the end surfaces 152a and 152b of the stator core 152 such that they extend in a ring shape around the central axis 101 while the split coil end covers 170m and 170n are attached to the stator 150. The annular portions 173 form cooling oil passages 172 (172m and 172n). The annular portions 173 each have an inner peripheral edge 201 arranged on the inner radial side of the stator core 152 and an outer peripheral edge 202 arranged on the outer radial side of the stator core 152.

The plurality of elongated portions 174 are connected to the inner peripheral edge 201 of the annular portion 173 at intervals from one another in the circumferential direction of the stator core 152. Each elongated portion 174 is positioned between adjacent teeth portions 156 so as to extend in the axial direction of the stator core 152 while the split coil end covers 170m and 172n are attached to the stator 150. The elongated portions 174 form coolant oil communicating passages 171 in the spaces between adjacent teeth portions 156. The cooling oil communicating passages 171 communicate the cooling oil passage 172m with the cooling oil passage 172n.

An oil supply port 170h as a coolant supply portion and an oil drain port 170i as a coolant discharge portion are formed in each of the split coil end covers 170m and 170n. Cooling oil supplied to the cooling oil passage 172 through the oil supply port 170h flows in the circumferential direction of the stator core 152 as indicated by the white arrow in FIG. 5, during which time it cools the stator 150 around the coil end portions 162. The cooling oil that has been heated as a result of this cooling is then discharged from the cooling oil passage 172 through the oil drain port 170i.

Continuing on, the coil end cover fixing structure provided in the motor-generator 100 in FIG. 1 will now be described. Incidentally, in some cases in the description below, only of one of the fixing structure of the split coil end cover 170m or the fixing structure of the split coil end cover 170n will be described, but both of these fixing structures are basically the same.

Figure 7:
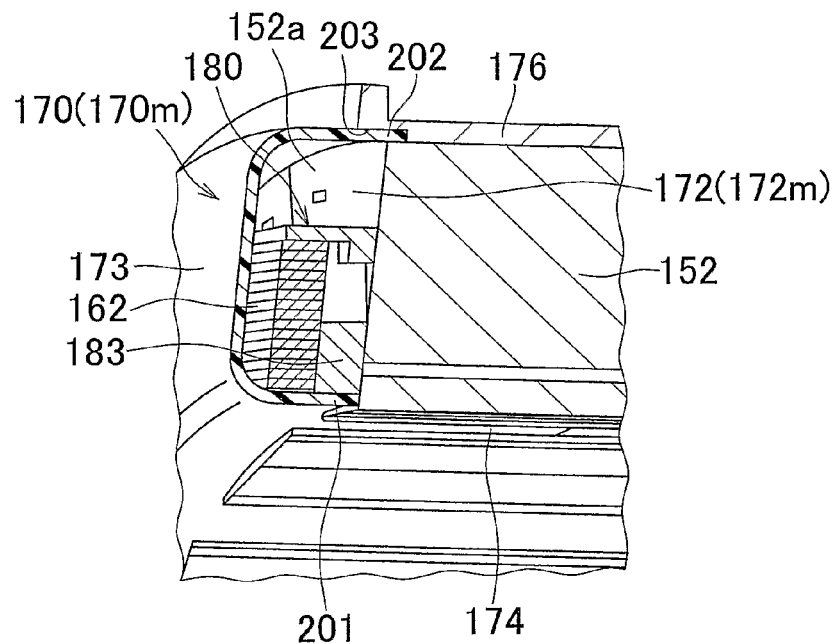
FIG. 7 is a sectional view of a coil end cover fixing structure according to a first example embodiment of the invention.

FIG. 7 is a sectional view of the coil end cover fixing structure according to this first example embodiment of the invention. In the drawing, the cross-section of the stator is taken along line VII-VII in FIG. 5.

The fixing structure of the split coil end cover 170m will be representatively described with reference to FIG. 7. In this example embodiment, the split coil end cover 170m is fixed in place by being sandwiched between the fastening ring 176 and the stator core 152.

The fastening ring 176 and the stator core 152 are components that make up part of the motor-generator 100. The fastening ring 176 is a component provided to integrally retain the plurality of split stator cores 153, and the stator core 152 is a component for generating a magnetic field for rotating the rotor 120.

The fastening ring 176 is cylindrical in shape and has an inner peripheral groove 203 formed on its inner peripheral surface. The inner peripheral groove 203 is formed on the edge portion of the fastening ring 176 in the axial direction of the stator core 152 by forming a step on that inner peripheral surface. The inner peripheral groove 203 is formed to provide a gap between the inner peripheral surface of the fastening ring 176 and the outer peripheral surface of the stator core 152. The inner peripheral groove 203 is formed around the entire circumference of the stator core 152. The outer peripheral edge 202 of the split coil end cover 170m is fitted into the gap formed by this inner peripheral groove 203.

Figures 8A, 8B:
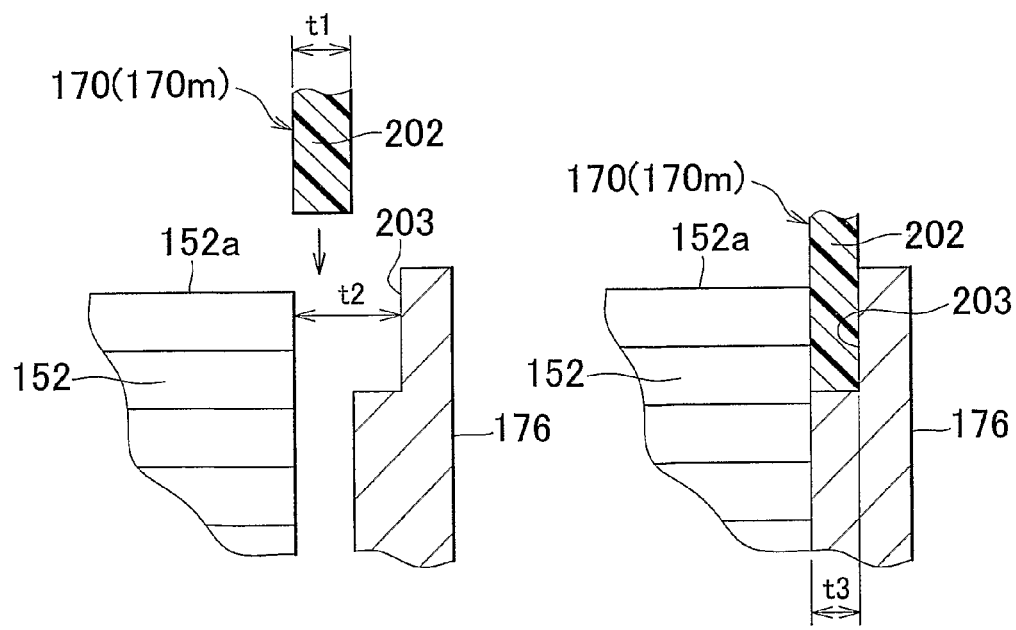
FIG. 8A and FIG. 8B are sectional views of the process of assembling the coil end cover in FIG. 7.

FIG. 8A and FIG. 8B are sectional views of the process of assembling the coil end cover in FIG. 7. Referring to FIG. 8A, in the manufacturing process of the stator core 152, a split stator 153 in which the insulator 180 and the coils 160U, V, and W are mounted to the teeth portions 156 is prepared. The plurality of split stator cores 153 are arranged in a circle, and the fastener ring 176, the diameter of which has been expended by heating, is arranged on the outer periphery of the plurality of split stator cores 153 that have been arranged in a circle. At this time, the outer peripheral edge 202 of the split coil end cover 170m is inserted into the gap between the inner peripheral groove 203 and the stator core 152.

Referring now to FIG. 8B, the fastening ring 176 cools over time, and as it cools, its diameter contracts. As a result, the outer peripheral edge 202 of the split coil end cover 170m becomes sandwiched between the fastening ring 176 and the stator core 152.

In this manufacturing process, when the thickness of the outer peripheral edge 202 of the split coil end cover 170m is t1, the size of the gap between the inner peripheral groove 203 when the diameter of the fastening ring 176 is expanded and the stator core 152 is t2, and the size of the gap between the inner peripheral groove 203 after the diameter of the fastening ring 176 has contracted is t3, the relationships among t1, t2, and t3 are t2>t1>t3.

In this example embodiment, the coil end cover 170 is made of thermoplastic resin. Therefore, when the fastening ring 176 is shrink fitted to the outer periphery of the plurality of split stator cores 152 that are arranged in a circle, the surface layer portion of the coil end cover 170 becomes soft and fluid from the heat of the fastening link 176. Then as the temperature of the fastening link 176 drops, the coil end cover 170 hardens again. As a result, the fastening ring 176, the stator core 152, and the coil end cover 170 are integrated by the resin, thus enabling a good seal to be obtained. Also, another member such as an O-ring for providing a seal is no longer unnecessary, so the motor-generator 100 can be manufactured at a lower cost.

Further, as cooling oil is supplied to the coil end cover 170 and the pressure inside the cover increases, the contact pressure between the coil end cover 170 and the inside wall of the inner peripheral groove 203 increases, which improves the seat between the two.

The motor-generator in this first example embodiment of the invention is provided with the stator core 152, the coil 160 that is wound around the stator core 152 and includes the coil end portions 162 that protrude from the end surfaces 152a and 152b of the stator core 152, and the coil end cover 170 that serves as a cover body that forms the cooling oil passage 172 as a coolant passage around the coil end portions 162. The coil end cover 170 is fixed in place by engaging with a portion of the stator core 152 and the fastening ring 176, which serve as members that make up part of the motor-generator.

According to the thus-structured motor-generator of the first example embodiment of the invention, providing the coil end cover 170 for forming the cooling oil passage 172 makes it possible to efficiently cool the coil end portions 162 which generate a large amount of heat. Also, the fastening ring 176 which is originally provided is used to fix the coil end cover 170 so it is not necessary to provide separate fixing means for the coil end cover 170. As a result, the structure for cooling the coil end portions 162 can be made simple. Also, the assembly process is simplified compared to when fixing means such as a bolt is used.

Figure 9:
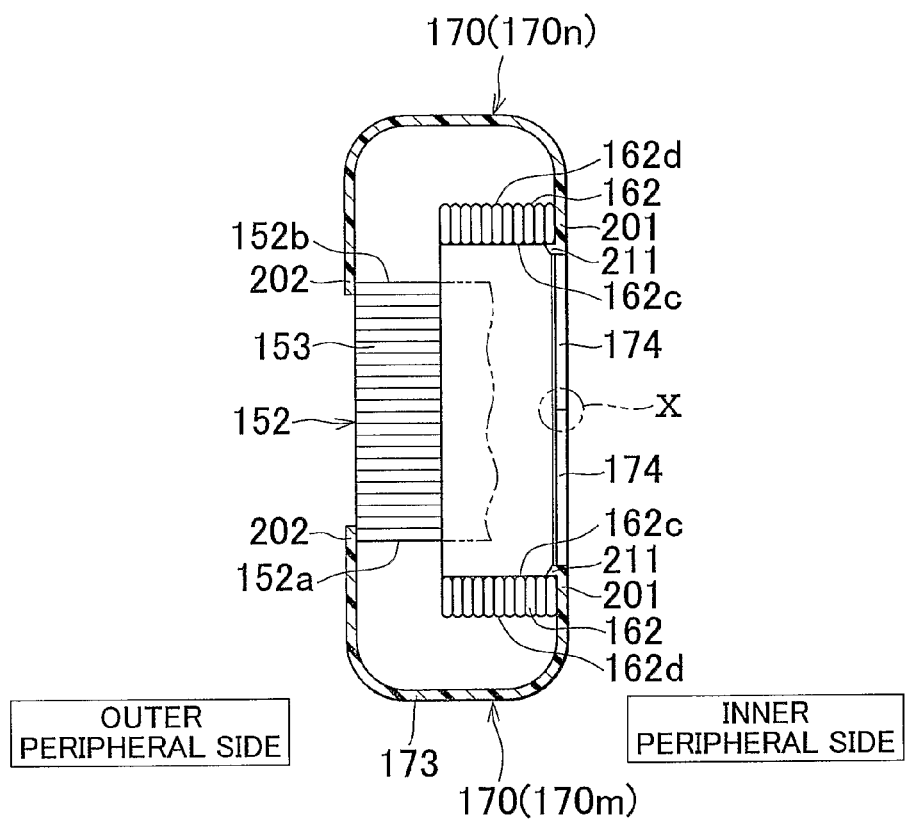
FIG. 9 is a perspective view of a coil end cover fixing structure according to a second example embodiment of the invention.

FIG. 9 is a perspective view of a coil end cover fixing structure according to a second example embodiment of the invention. The drawing shows a cross section of the stator taken along line IX-IX-IX in FIG. 5.

Referring to FIGS. 3 and 9, a gap is formed between the end surface 152a of the stator core 152 and the coil end portions 162 by the protruding portion 183, and a gap is formed between the end surface 152b of the stator core 152 and the coil end portions 162 by the protruding portion 184. The coil end portions 162 have an inner edge 162c that faces the corresponding edge surface 152a and 152b across a gap, and an outer edge 162d arranged on the back side of the inner edge 162c.

With regards to the representative fixing structure of the split coil end cover 170m, in this example embodiment, the split coil end cover 170m has pawl-shaped protrusions 211 which serve as first engaging portions. The pawl-shaped protrusions 211 are formed protruding outward in the radial direction of the stator core 152 from the tip ends of the inner peripheral edges 201. The pawl-shaped protrusion 211 may be formed around the entire periphery in the circumferential direction of the stator core 152, or a plurality of pawl-shaped protrusions 211 may be formed at intervals from one another in the circumferential direction of the stator core 152. The pawl-shaped protrusions 211 are engaged with the inner edges 162e of the coil end portions 162.

The tip ends of the elongated portions 174 of the split coil end cover 170m and the tip ends of the elongated portions 174 of the split coil end cover 170n abut against one another in the spaces between adjacent teeth portions 156.

In the sectional position shown in FIG. 9, the annular portions 173 have U-shaped cross-sections, one end of which is open, with one edge being the inner peripheral edge 201 and the other edge being the outer peripheral edge 202. The split coil end cover 170m has an elastically deformable shape in the radial direction of the stator core 152 so that the distance between the inner peripheral edge 201 and the outer peripheral edge 202 can change. In this example embodiment, tension generated by elastic deformation in the radial direction of the stator core 152 causes the split coil end cover 170m press against the outer peripheral surface of the stator core 152.

In this example embodiment, the position of the coil end cover 170 with respect to the coil 160 can be primarily determined by the engagement of the pawl-shaped protrusions 211 with the inner edges 162, and the abutment of the elongated portions 174 against one another. Also, the tension of the elastically deformed coil end cover 170 fixes the outer peripheral side of the coil end cover 170 (i.e., the outer peripheral edge 202), as well as ensures a seal between the coil end cover 170 and the stator core 152. Therefore, the formation of the parts of the motor-generator is simpler, which enables them to be manufacture inexpensively.

Also, the tension of the coil end cover 170 enables the coil 160 to be assembled pushed toward the outer radial side. As a result, eddy current flowing in the coil can be reduced so heat generation in the coil can be suppressed.

Figure 10:
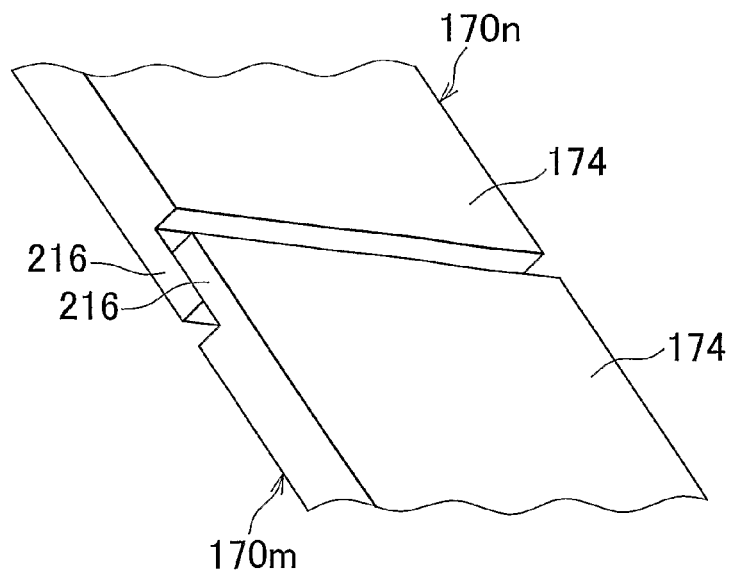
FIG. 10 is a perspective view of the coil end cover fixing structure in FIG. 9 according to a first modified example of the second example embodiment.

FIG. 10 is a perspective view of the coil end cover fixing structure shown in FIG. 9 according to a first modified example of the second example embodiment. This drawing shows the area encircled by the alternate long and two short dashes line X in FIG. 9.

Referring to FIG. 10, in this modified example, a stepped portion 216 is formed on the tip ends of the elongated portions 174 of both of the split coil end covers 170m and 170n. The stepped portions 216 are formed such that when the stepped portion 216 formed on the split coil end cover 170m overlaps with the stepped portion 216 formed on the split coil end cover 170n, the elongated portions 174 of the split coil end covers 170m and 170n connect and extend in the axial direction of the stator core 152. The seal at the position where the split coil end cover 170m joins with the split coil end cover 170n is ensured by having those stepped portions 216 overlap in the positions where the elongated portions 174 of the split coil end cover 170m and the split coil end cover 170n abut against one another.

Figure 11:
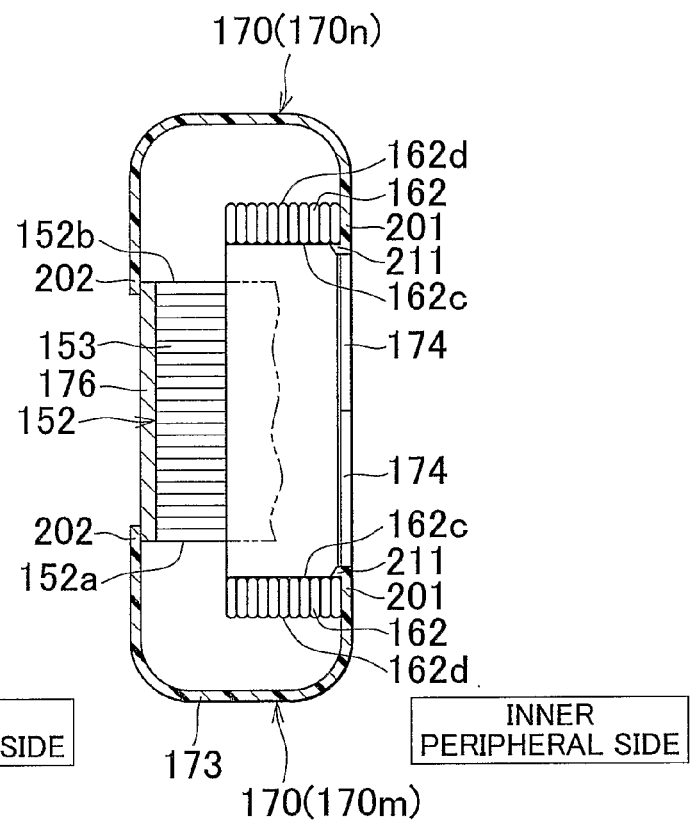
FIG. 11 is a sectional view of the coil end cover fixing structure in FIG. 9 according to a second modified example of the second example embodiment.

FIG. 11 is a sectional view of the coil end cover fixing structure shown in FIG. 9 according to a second modified example of the second example embodiment. Referring to FIG. 11, in this modified example, the tension of the elastically deformed split coil end covers 170m and 170n presses the outer peripheral edge 202 of the coil end cover 170, against the fastening ring 176. If this fastening ring 176 is shaped so that it extends to the end portion of the stator core 152, the fastening ring 176 can also be used to fix the coil end cover 170.

Figure 12:
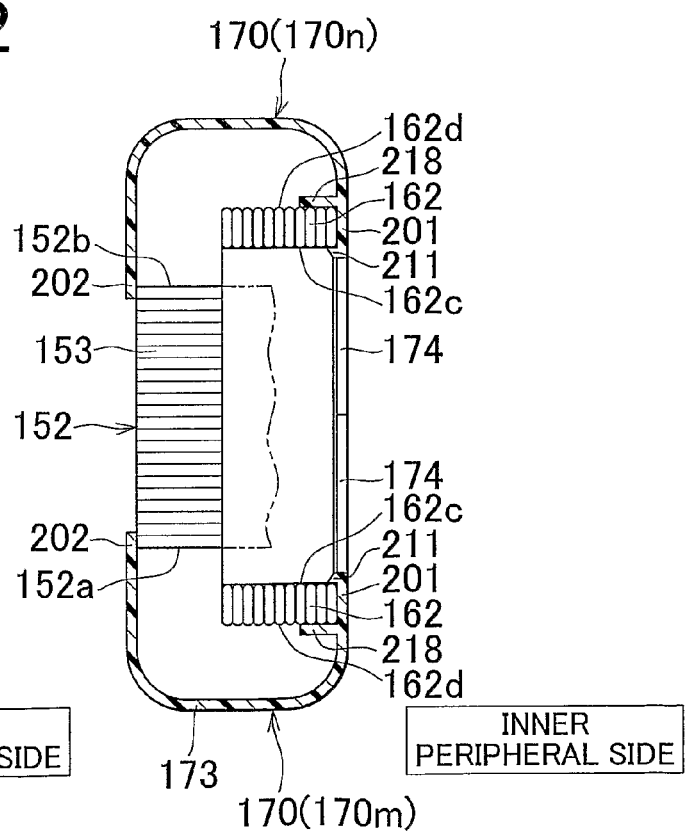
FIG. 12 is a perspective view of the coil end cover fixing structure in FIG. 9 according to a third modified example of the second example embodiment.

FIG. 12 is a perspective view of the coil end cover fixing structure shown in FIG. 9 according to a third modified example of the second example embodiment. Referring to FIG. 12, in this modified example, the split coil end covers 170m and 170n have protrusions 218 in addition to the pawl-shaped protrusions 211. The protrusions 218 are shaped so that they protrude outward in the radial direction of the stator core 152 from positions a predetermined distance away from the pawl-shaped protrusions 211. The protrusions 218 engage with the outer edges 162d of the coil end portions 162. As a result, the coil end portions 162 are able to be sandwiched between the pawl-shaped protrusions 211 and the protrusions 218.

According to this kind of structure, the position of the coil end cover with respect to the coil 160 can be primarily determined even without employing a structure in which the tip ends of the elongated portions 174 of the split coil end cover 170m abut against the tip ends of the elongated portions 174 of the split coil end cover 170n.

The thus-structured motor-generator according to this second example embodiment of the invention is able to obtain the same effects as those obtained by the first example embodiment described above.

Figure 13:
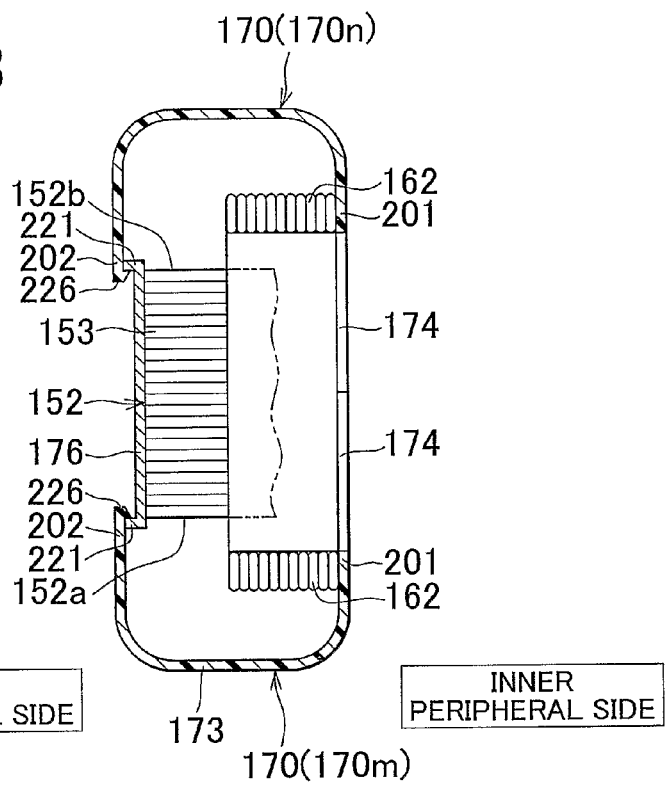
FIG. 13 is a sectional view of the coil end cover fixing structure according to the third example embodiment of the invention.

FIG. 13 is a sectional view of a coil end cover fixing structure according to a third example embodiment of the invention. This drawing shows the sectional shape of the stator at the same location as the cross-section shown in FIG. 9.

Referring to FIG. 13, with regards to the representative fixing structure of the split coil end cover 170m, in this example embodiment, the split coil end cover 170m has pawl-shaped protrusions 226 which serve as third engaging portions. The pawl-shaped protrusions 226 are formed protruding inward in the radial direction of the stator core 152 from the tip ends of the outer peripheral edges 202. The fastening ring 176 has flange portions 221 that serve as second engaging portions. These flange portions 221 are shaped so as to flare out in a flange shape radially outward from the end portions of the stator core 152 in the axial direction thereof. The pawl-shaped protrusions 226 engage with the flange portions 221.

According to this kind of structure, the coil end cover 170 is able to be fixed and positioned by the engagement of the flange portions 221 with the pawl-shaped protrusions 226.

Incidentally, in the mode illustrated in FIG. 13, the pawl-shaped protrusions may be joined to the flange portions 221 by welding, e.g., laser welding, after attaching the split coil end cover to the stator 150. In this case, a sufficient seal is able to be obtained between the coil end cover 170 and the stator core 152 even when no internal pressure is applied to the coil end cover 170.

Figure 14:
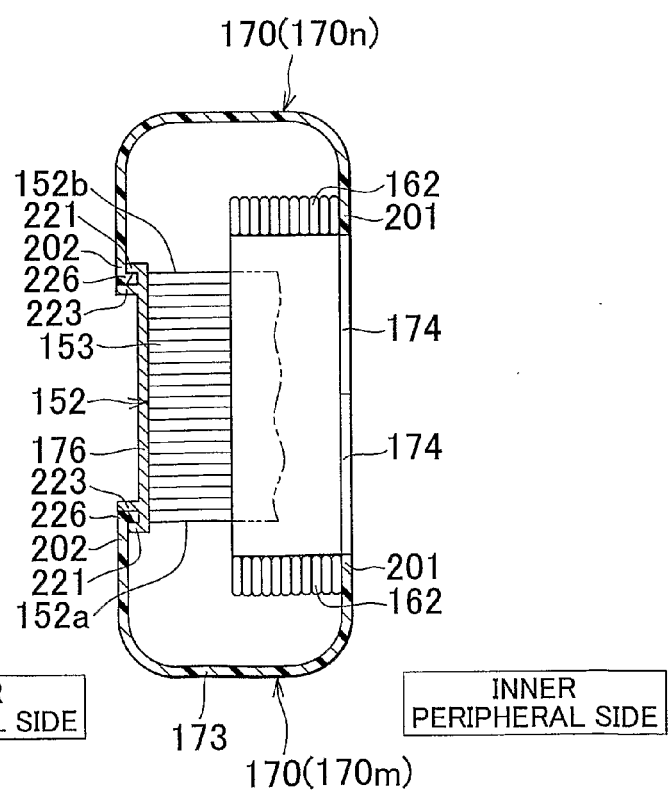
FIG. 14 is a perspective view of the coil end cover fixing structure in FIG. 13 according to a modified example of the third modified example.

FIG. 14 is a perspective view of the coil end cover fixing structure shown in FIG. 13 according to a modified example of the third example embodiment. Referring to FIG. 14, in this modified example, the fastening ring 176 also has flange portions 223 in addition to the flange portions 221. These flange portions 223 are shaped so as to flare in a flange shape outward in the radial direction of the stator core 152 from positions a predetermined distance from the flange portions 221. The pawl-shaped protrusions 226 are positioned between the flange portions 221 and the flange portions 223 while engaged with the flange portions 221.

According to this kind of structure, the coil end cover 170 can be positioned in the axial direction of the stator core 152 by a structure in which the pawl-shaped protrusions 226 fit together with the flange portions 221 and the flange portions 223. Also, the seal of the coil end cover 170 can be improved because a labyrinth structure in which the pawl-shaped protrusions 226 mesh with the flange portions 221 and the flange portions 223 is able to be obtained.

The thus-structured motor-generator according to this third example embodiment of the invention is able to obtain the same effects as those obtained by the first example embodiment described above.

Figure 15:
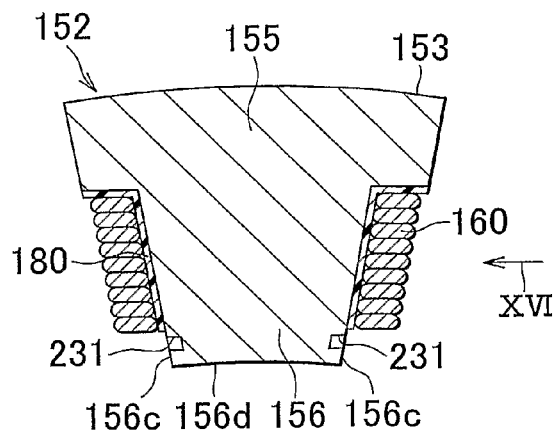
FIG. 15 is a sectional view of a split stator core used in a coil end cover fixing structure according to a fourth example embodiment of the invention.
Figure 16:
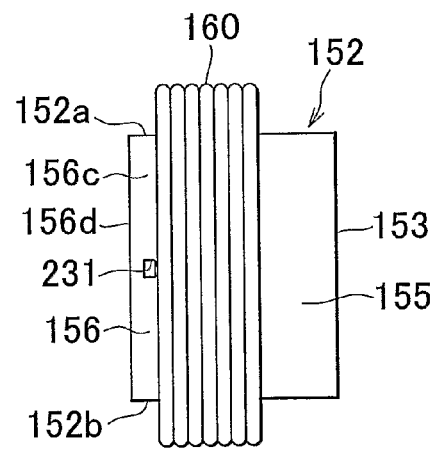
FIG. 16 is a side view of the split stator core as viewed from the direction indicated by arrow XVI in FIG. 15.

FIG. 15 is a sectional view of a split stator core used in a coil end cover fixing structure according to a fourth example embodiment of the invention. This drawing shows a cross-section taken along line XV-XV in FIG. 3. FIG. 16 is a side view of the split stator core as viewed from the direction indicated by arrow XVI in FIG. 15.

Referring to FIGS. 15 and 16, each the teeth portion 156 has side surfaces 156c and an inner peripheral surface 156d. The side surfaces 156c face the side surfaces 156c of the adjacent teeth portions 156 while the plurality of split stator cores 153 are arranged in a circle. The side surfaces 156c are exposed from the coil 160 when the coil 160 is wound around the teeth portions 156. The inner peripheral surface 156d faces the rotor 120 in FIG. 1 across a gap. Both ends of the inner peripheral surface 156d are continuous with the side surfaces 156c in the circumferential direction of the stator core 152.

Catching grooves 231 which are concave portions are formed in the teeth portions 156. These catching grooves 231 are formed indented from the side surfaces 156c. The catching grooves 231 are formed in intermediate positions on the stator core 152 in the axial direction thereof, i.e., in positions in the middle between the end surface 152a and the end surface 152b.

Figure 17:
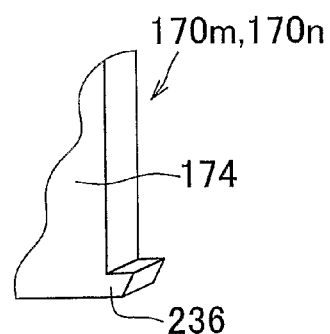
FIG. 17 is a perspective view of a coil end cover used in the coil end cover fixing structure according to the fourth example embodiment of the invention.

FIG. 17 is a perspective view of a coil end cover used in the coil end cover fixing structure according to the fourth example embodiment of the invention. The drawing illustrates the tip ends the elongated portions 174 of the split coil end covers 170m and 170n.

Referring to FIG. 17, each of the elongated portions 174 has a pawl portion 236 that serves as a fourth engaging portion. This pawl portion 236 is formed on the tip end of the elongated portion 174 that extends in the axial direction of the stator core 152 from the annular portion 173 shown in FIG. 6. The pawl portion 236 is formed such protruding in the circumferential direction of the stator core 152 when the elongated portion 174 is positioned between adjacent teeth portions 156.

Figure 18:
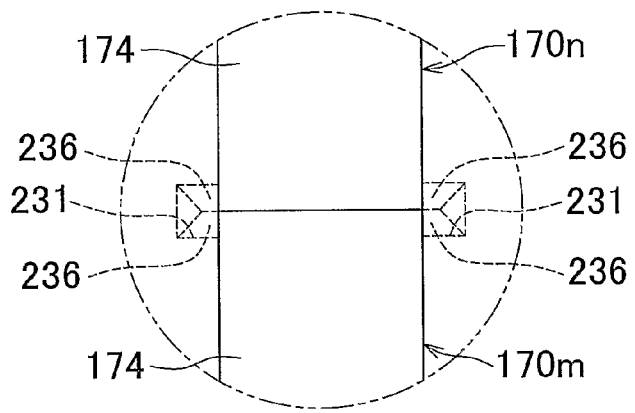
FIG. 18 is a view of the coil end cover fixing structure according to the fourth example embodiment of the invention.

FIG. 18 is a view of the coil end cover fixing structure according to the fourth example embodiment of the invention. This drawing shows the area encircled by the alternate long and two short dashes line XVIII in FIG. 5. Referring to FIG. 18, the pawl portions 236 are engaged with the catching groove 231 while the elongated portions 174 are positioned between adjacent teeth portions 156.

According to this kind of structure, in this example embodiment, irregularly shaped cores in which catching grooves 231 are formed are used as the split stator core 153, and the coil end cover 170 can be positioned by engaging the pawl portions 236 in these catching grooves 231. Also, the coil end cover 170 can be fixed even in a limited space such as between adjacent teeth portions 156.

Figure 19:
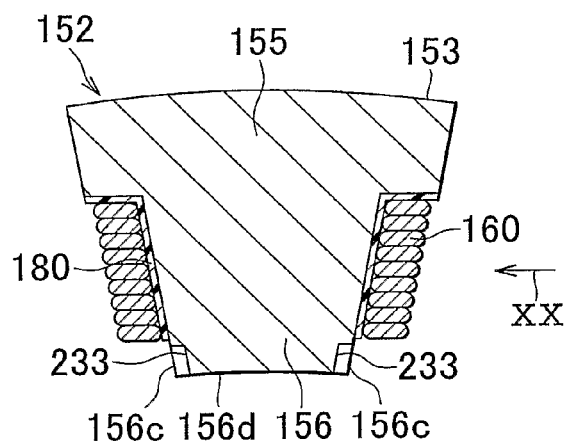
FIG. 19 is a sectional view of the split stator core in FIG. 15 according to a modified example of the fourth example embodiment.
Figure 20:
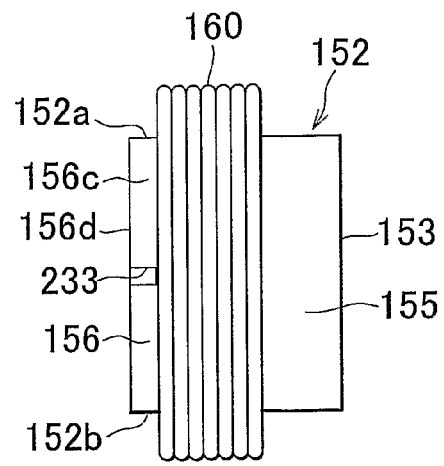
FIG. 20 is a side view of the split stator core as viewed from the direction indicated by arrow XX in FIG. 19 according to the modified example of the fourth example embodiment.

FIG. 19 is a sectional view of the split stator core in FIG. 15 according to a modified example of the fourth example embodiment, and FIG. 20 is a side view of the split stator core as viewed from the direction indicated by arrow XX in FIG. 19 according to the modified example of the fourth example embodiment. Referring to FIGS. 19 and 20, in this modified example, notches 233 are formed instead of the catching grooves 231 shown in FIG. 15 in the teeth portions 156. These notches 233 are formed in the corners between the side surfaces 156c and the inner peripheral surface 156d so that the notches 233 are indented from both the side surfaces 156c and the inner peripheral surface 156d. With this kind of structure as well, the same effects as described above can be obtained by engaging the pawl portions 236 with the notches 233 from the inner radial side of the stator core 152, while elastically deforming the split coil end covers 170m and 170n.

Figure 21:
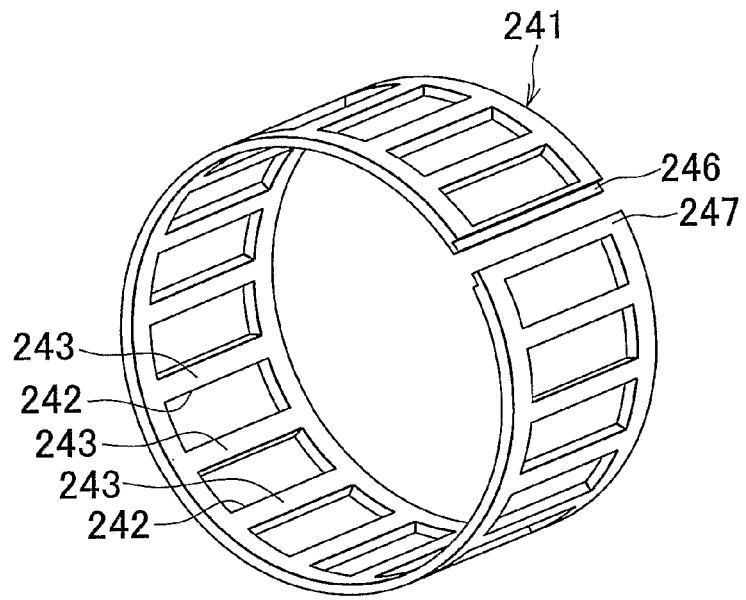
FIG. 21 is a perspective view of an inner cover used in the coil end cover fixing structure in FIG. 18 according to the modified example of the fourth example embodiment.

FIG. 21 is a perspective view of an inner cover used in the coil end cover fixing structure in FIG. 18 according to the modified example of the fourth example embodiment. Referring to FIG. 21, in this modified example, an inner cover 241 is attached to the inside of the stator core 152 instead of providing the elongated portions 174 on the split coil end covers 170m and 170n.

The inner cover 241 is formed so as to be able to elastically deform in the circumferential direction and is made of a bendable rectangular plate. A plurality of openings 242 are formed at intervals in the longitudinal direction of the inner cover 241. Each of these openings 242 is shaped so as to be able to receive the tip end portion of a teeth portion 156. Rib-shaped portions 243 that extend in one direction are formed between adjacent openings 242. The end portions 246 and 247 of the inner cover 241 that abut against one another have the same structure as the stepped portions 216 shown in FIG. 10.

In this modified example, the inside cover 241 is bend and arranged inside the stator core 152, and the tip end portions of the teeth portions 156 are inserted into the openings 242. With this kind of structure, the rib-shaped portions 243 are positioned between adjacent teeth portions 156, and the cooling oil communicating passages 171 in FIG. 5 is formed on the insides of these rib-shaped portions 243.

The thus-structured motor-generator according to this fourth example embodiment of the invention is able to obtain the same effects as those obtained by the first example embodiment described above.

Figure 22:
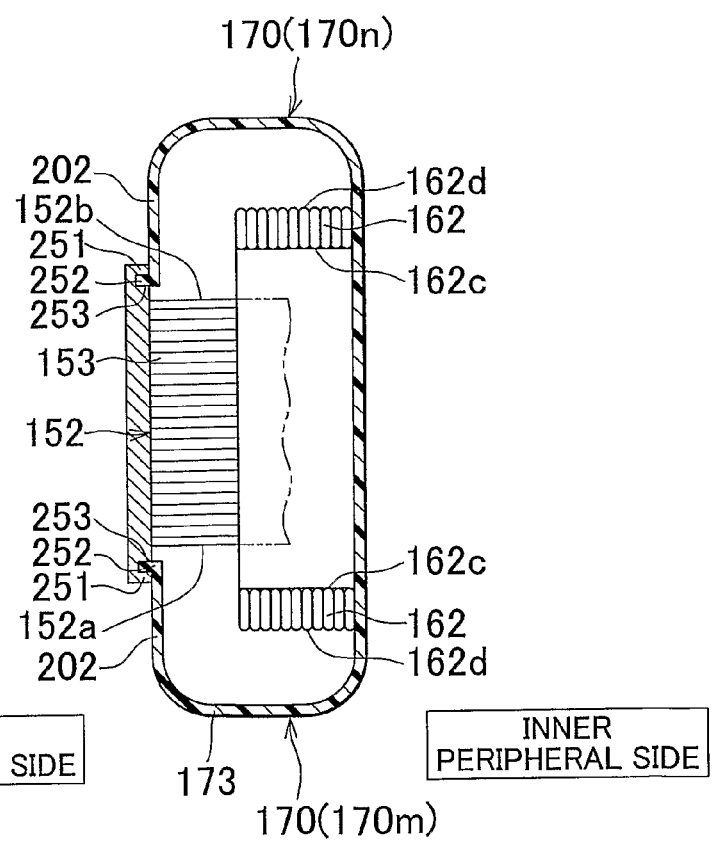
FIG. 22 is a sectional view of a coil end cover fixing structure according to a fifth example embodiment of the invention.

FIG. 22 is a sectional view of a coil end cover fixing structure according to a fifth example embodiment of the invention. This drawing shows the sectional shape of the stator at the same location as the cross-section shown in FIG. 9. Referring to FIG. 22, with regards to the representative fixing structure of the split coil end cover 170m, in this example embodiment, the split coil end cover 170m has pawl-shaped protrusions 252 which serve as third engaging portions. The pawl-shaped protrusions 252 are formed protruding outward in the radial direction of the stator core 152 from the tip ends of the outer peripheral edges 202. Groove face portions 251 which serve as second engaging portions are formed on the fastening ring 176. These groove face portions 251 are shaped so that they protrude radially inward from the end portion of the stator core 152 in the axial direction thereof. The groove face portions 251 are formed by the wall portions of inner peripheral grooves 253 that are formed in the fastening ring 176. The pawl-shaped protrusions 252 are engaged with these groove face portions 251.

When comparing this structure with the structures in FIGS. 13 and 14 described in the third example embodiment, in this example embodiment, the pawl-shaped protrusions 252 are engaged with the groove face portions 251 from the inner radial side of the stator core 152.

According to this kind of structure, the coil end cover 170 is able to be fixed and positioned by the engagement of the pawl-shaped protrusions 252 in the groove face portions 251. Further, as cooling oil is supplied to the coil end cover 170 and the pressure inside the cover increases, the contact pressure between the coil end cover 170 and the fastening ring 176 increases, which improves the seat between the two.

The thus-structured motor-generator according to this fifth example embodiment of the invention is able to obtain the same effects as those obtained by the first example embodiment described above.

Figure 23:
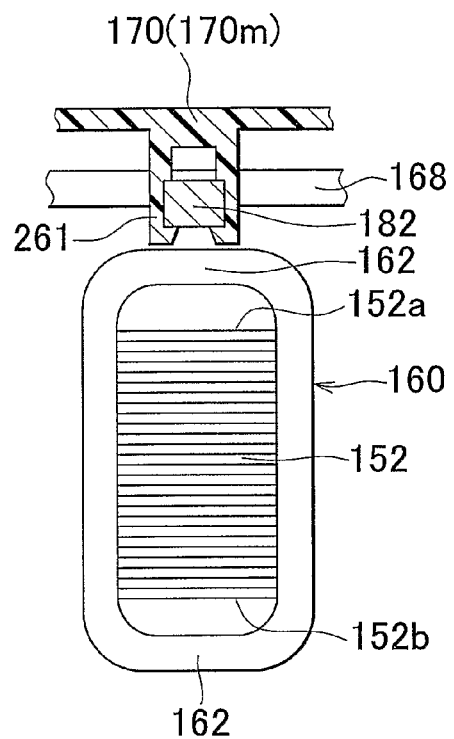
FIG. 23 is a sectional view of a coil end cover fixing structure according to a sixth example embodiment of the invention.

FIG. 23 is a sectional view of a coil end cover fixing structure according to a sixth example embodiment of the invention. This drawing shows a cross-section of the stator taken along line XXIII-XXIII in FIG. 2. Referring to FIG. 23, in this example embodiment, the split coil end cover 170m has a pawl portion 261 that serves as a fifth engaging portion. This pawl portion 261 is formed so as to extend toward the coil end portion 162 from the inside wall of the annular portion 173 in FIG. 6 while the split coil end cover 170m is fixed to the stator 150. The tip end of the pawl portion 261 that extends toward the coil end portion 162 is shaped like a pawl that is able to grip the connecting wire supporting portion 182. This pawl portion is engaged with the connecting wire supporting portion 182.

According to this kind of structure, in this example embodiment, the coil end cover 170m is able to be fixed and positioned using the connecting wire supporting portion 182 provided to support the connecting wire 168.

The thus-structured motor-generator according to this sixth example embodiment of the invention is able to obtain the same effects as those obtained by the first example embodiment described above.

Figure 24:
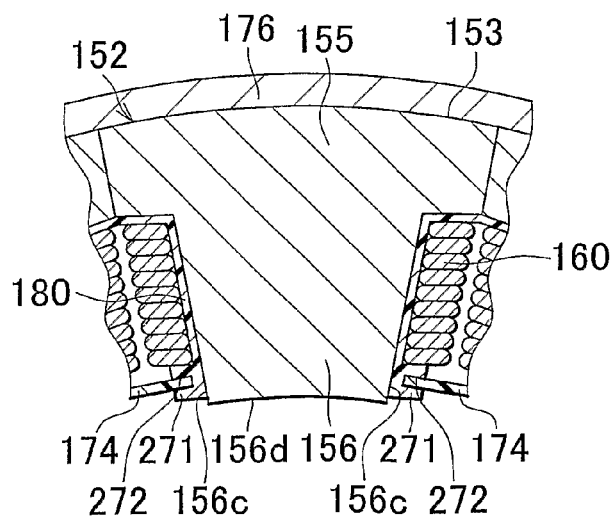
FIG. 24 is a sectional view of a coil end cover fixing structure according to a seventh example embodiment of the invention.

FIG. 24 is a sectional view of a coil end cover fixing structure according to a seventh example embodiment of the invention. This drawing shows the sectional shape of the stator at the same location as the cross-section shown in FIG. 15. Referring to FIG. 24, in this example embodiment, the insulator 180 has inserting portions 271. These inserting portions 271 are formed on the inner radial side end portion of the teeth receiving portion 186. A guide groove 272 that extends in the axial direction of the stator core 152 is formed by each of these inserting portions 271. This guide groove 272 is shaped so as to be able to receive a peripheral edge of the elongated portion 174 in the circumferential direction of the stator core 152. The elongated portion 174 is positioned between adjacent teeth portions 156 by the peripheral edge of that elongated portion 174 being inserted into these guide grooves 272.

Figure 25:
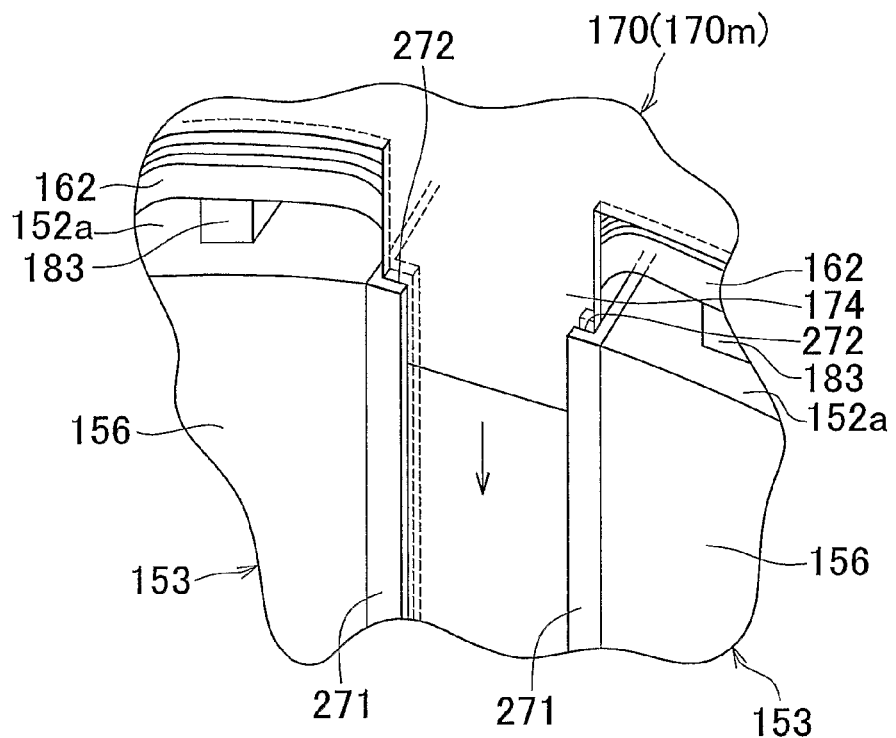
FIG. 25 is a perspective view of a first process in a manufacturing method of the coil end cover fixing structure shown in FIG. 24.
Figure 26:
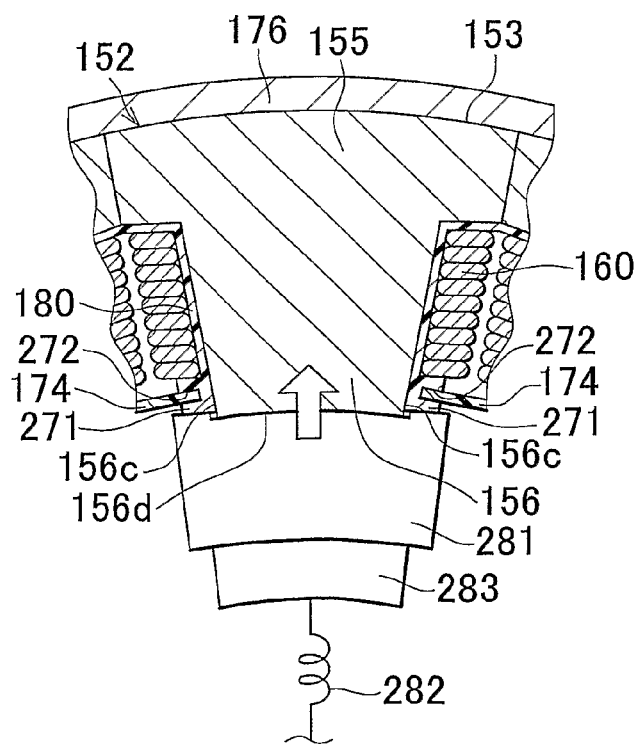
FIG. 26 is a perspective view of a second process in a manufacturing method of the coil end cover fixing structure shown in FIG. 24.

FIG. 25 is a perspective view of a first process in a manufacturing method of the coil end cover fixing structure shown in FIG. 24, and FIG. 26 is a perspective view of a second process in a manufacturing method of the coil end cover fixing structure shown in FIG. 24.

Referring to FIG. 25, in the manufacturing process of the stator core 152, a split stator 153 in which the insulator 180 and the coils 160U, V, and W are mounted to the teeth portions 156 is prepared. The plurality of split stator cores 153 are arranged in a circle, and the fastener ring 176, the diameter of which has been expended by heating, is arranged on the outer periphery of the plurality of split stator cores 153 that have been arranged in a circle. At this time, the coil end cover 170 is assembled to the stator core 152 by inserting the peripheral edge of the elongated portion 174 into the guide groove 272 and sliding the elongated portion 174 in the axial direction of the stator core 152.

Referring to FIG. 26, in order to precisely assemble the plurality of split stator core 153 and thus improve the precision of the inside diameter of the stator 150, an internal restraining jig 281 is arranged on the inside of the stator core 152 when shrink fitting the fastening ring 176 described above. At this time, the internal restraining jig 281 abuts against the inserting portions 271 of the insulator 180 and the inner peripheral surface 156d of the teeth portion 156. The internal restraining jig 281 urges each split stator core 153 toward the outside in the radial direction of the stator core 152 using the elastic force of a spring 282.

In this example embodiment, the inside restraining jig 281 has a heater 283. During shrink fitting of the fastening ring 176, the heat generated by the heater 283 is transmitted to the inserting portion 271, making the surface layer of the inserting portions 271 soft and fluid. Then the internal restraining jig 281 is removed and the resin that forms the inserting portions 271 hardens as the temperature drops, such that the inserting portions 271 become integrated with the elongated portion 174 that has been inserted into the guide grooves 272.

According to this kind of structure, integrating the inserting portions 271 with the elongated portion 174 by first softening and then re-hardening the coil end cover 170 improves the seal and obviates the need for another member such as an O-ring for the seal, thereby enabling the motor-generator 100 to be manufactured at a low cost. Also, The shrink fitting process of the fastening ring 176 and the integrating process of the inserting portion 271 and the elongated portion 174 can be performed simultaneously, which enables the manufacturing time of the stator 150 to be shorter.

The thus-structured motor-generator according to this seventh example embodiment of the invention is able to obtain the same effects as those obtained by the first example embodiment described above.

Incidentally, when manufacturing the motor-generator 100 shown in FIG. 1, the coil end cover 170 may be fixed to the stator coil 152 by an appropriate combination of any of the coil end cover fixing structures in example embodiments 1 to 7 described above.

Figure 27:
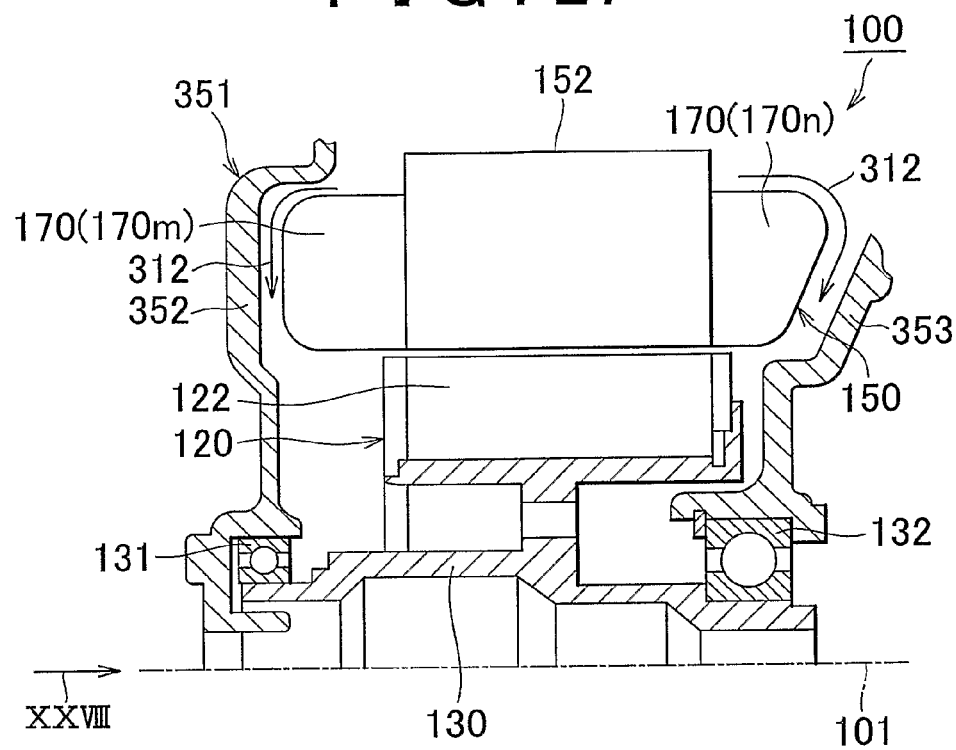
FIG. 27 is a sectional view of a motor-generator according to an eighth example embodiment of the invention.

Continuing on, the oil flow control structure provided in the motor-generator 100 shown in FIG. 1 will now be described. FIG. 27 is a sectional view of a motor-generator according to an eighth example embodiment of the invention. This drawing is an expanded view of the sectional shape of the motor-generator 100 shown in FIG. 1.

Referring to FIG. 27, the motor-generator 100 also has a motor case 351 as a case body. This motor case 351 is case-shaped and houses the rotor shaft 130, the rotor 120, and the stator 150. This motor case 351 is made of metal. The motor case 351 is provided exposed in the engine compartment of the hybrid vehicle. The motor case 351 has a wall portion 352 that faces the split coil end cover 170m across a gap, and a wall portion 353 that faces the split coil end cover 170n across a gap.

The rotor shaft 130 is rotatably supported with respect to the motor case 351 via a bearing 131 and a bearing 132 provided apart from one another in the axial direction of the central axis 101. The fastening ring 176 shown in FIG. 5 is fixed to the motor case 351 by bolts.

Figure 28:
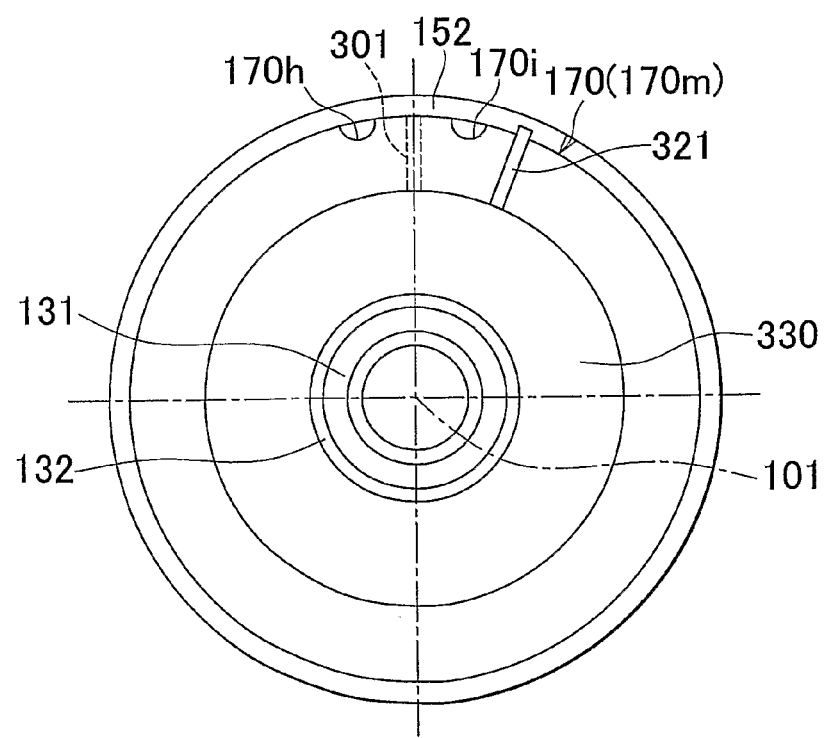
FIG. 28 is a front view of a stator and bearing as viewed from the direction indicated by arrow XXVIII in FIG. 27.

FIG. 28 is a front view of the stator and bearing as viewed from the direction indicated by arrow XXVIII in FIG. 27. Referring to FIG. 28, the bearings 131 and 132 are ring-shaped centered about the central axis 101. When viewed from the axial direction of the central axis 101, the bearings 131 and 132 are arranged in spaces 330 to the inside of the stator core 152.

Figure 29:
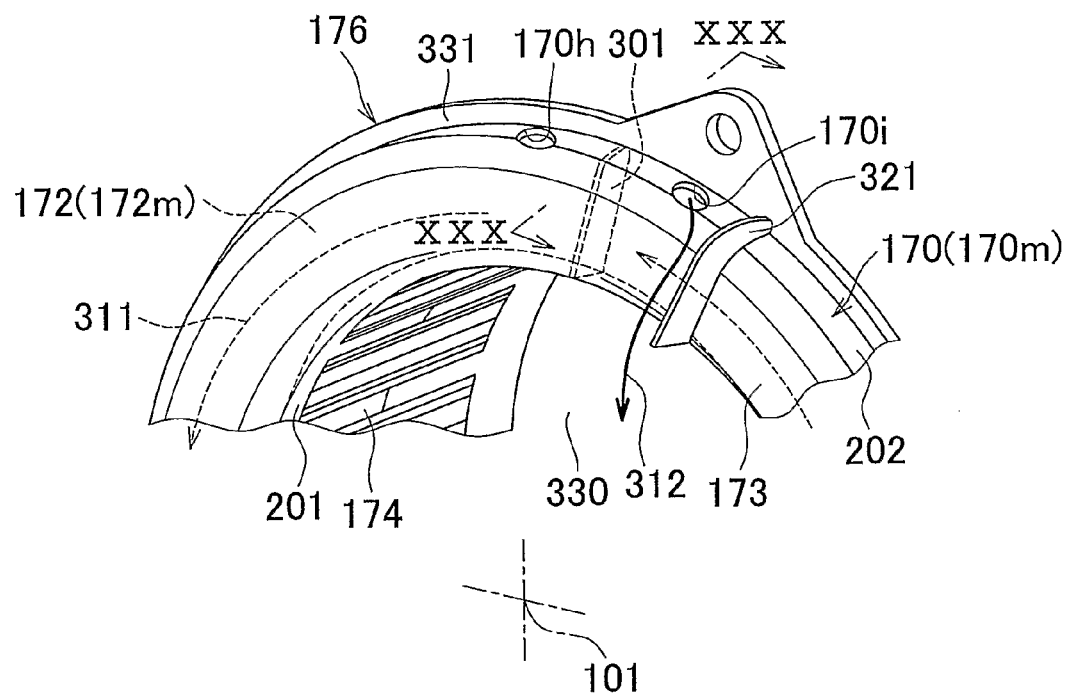
FIG. 29 is a perspective view of an oil flow control structure according to the eighth example embodiment of the invention.

FIG. 29 is a perspective view of an oil flow control structure according to the eighth example embodiment of the invention. The drawing shows only the split coil end cover 170m, but the split coil end cover 170n has the same structure as the split coil end cover 170m.

Referring to FIGS. 28 and 29, when the motor-generator 100 is mounted in the hybrid vehicle, the oil drain port 170i is provided vertically above the central axis 101 that is arranged at the center of the stator core 152. In other words, the oil drain port 170i is provided in any position in the upper half of the split coil end cover 170m that extends in a circle.

In this example embodiment, the oil drain port 170i is provided near the highest point of the split coil end cover 170m. The oil drain port 170i is provided higher than the highest part of the bearings 131 and 132. The oil drain port 170i is provided in an upward facing position in the outer peripheral surface of the annular portion 173.

The oil supply port 170h is formed in a position adjacent to the oil drain port 170i in the circumferential direction of the stator core 152.

The motor-generator 100 also includes an oil guiding rib 321 that serves as a guide member. This oil guiding rib 321 is formed in a rib shape on the surface of the split coil end cover 170m. The oil guiding rib 321 is formed adjacent to the oil drain port 170i in the circumferential direction of the stator core 152, in a position vertically below the oil drain port 170i. The oil guiding rib 321 is formed extending from an upward facing position on the annular portion 173 to a horizontally facing position on the annular portion 173.

Referring to FIGS. 27 and 29, oil discharged from the cooling oil passage 172 through the oil drain port 170i travels along the surface of the annular portion 173. In this example embodiment, providing the oil guiding rib 321 on that surface prevents the oil from flowing in the circumferential direction of the stator core 152, and instead guides that oil to the space 330 on the inside of the stator core 152, as shown by arrow 312 in the drawing.

The oil that has been guided to the space 330 is supplied to the bearing 131 across the gap between the stator 150 and the wall portion 352 of the motor case 351. Also, the oil that has been discharged from the oil drain port 170i of the split toil end cover 170n is guided by the oil guiding rib 321 so that it is supplied to the bearing 132 across the gap between the stator 150 and the wall portion 353 of the motor case 351.

In this way, in this example embodiment, the bearings 131 and 132 can be lubricated using the oil that has been discharged from the cooling oil passage 172, so it is no longer necessary to provide a special lubricating mechanism for this component. As a result, the oil pan which is provided separately is able to be smaller and the cost for machining oil passages for lubrication can be reduced, for example, which ultimately enable the manufacturing cost of the motor-generator 100 to be reduced.

Incidentally, in this example embodiment, the rib-shaped oil guiding rib 321 is formed on the coil end cover 170. However, instead of this oil guiding rib 321, an oil-guiding groove that is formed indented from the surface of the annular portion 173 may be formed in the coil end cover 170.

Also, in this example embodiment, the described structure supplies oil that has been introduced into the space 330 to the bearings 131 and 132. However, the invention is not limited to this. For example, the structure May alternatively supply oil to the gears that make up the reduction mechanism 102 shown in FIG. 1. Also, the component to which the oil is supplied is not limited to a bearing or a gear as long as it is a component that requires lubrication, such as a power transmitting chain for example.

Next, the oil flow control structure provided inside the coil end cover 170 will be described. Incidentally, only the split coil end cover 170m will be described but the split coil end cover 170n has the same structure.

Figure 30:
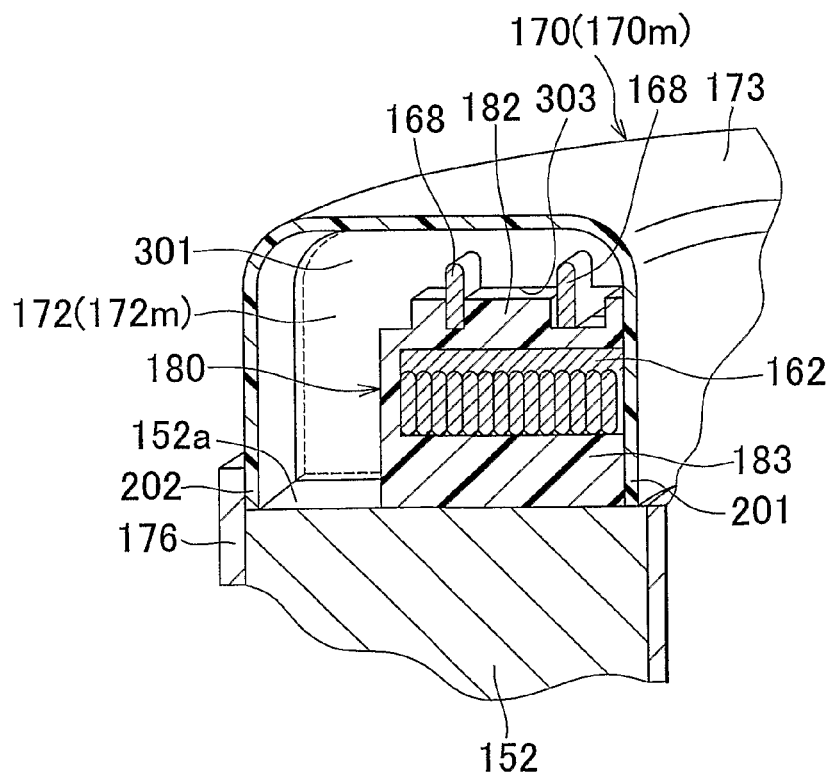
FIG. 30 is a sectional view of the stator taken along line XXX-XXX in FIG. 29.

FIG. 30 is a sectional view of the stator taken along line XXX-XXX in FIG. 29. Referring to FIGS. 29 and 30, the motor-generator 100 also has a divider plate 301 that serves as a plate member.

This divider plate 301 is provided inside the split coil end cover 170m, i.e., in the cooling oil passage 172m. This divider plate 301 is provided positioned between the oil supply port 170h and the oil drain port 170i in the circumferential direction of the stator core 152. The divider plate 301 has a plate shape and is provided so as to divide the space inside the split coil end cover 170m that is communicated with the oil supply port 170h and the space inside the split coil end cover 70m that is communicated with the oil drain port 170i.

A concave portion 303 is formed in this divider plate 301. This concave portion 303 is shaped to correspond to the outer shape of the connecting wire supporting portion 182 and is able to receive a connecting wire 168 that is supported by the connecting wire supporting portion 182. The divider plate 301 is fixed to the inside of the split coil end cover 170m by fitting the concave portion 303 on the connecting wire supporting portion 182.

In this example embodiment, arranging the divider plate 301 inside the split coil end cover 170m enables the oil supplied to the cooling oil passage 172m from the oil supply port 170h to flow in the direction indicated by arrow 311 in FIG. 29 without directly heading toward to the oil drain port 170i. In this case, the oil flows in a circle through the cooling oil passage 172m, thereby cooling the coil end portion 162, on its way from the oil supply port 170h to the oil drain port 170i, which improves the cooling efficiency of the coil end portion 162.

The motor-generator according to this eighth example embodiment of the invention is provided with the annular stator core 152, the coil 160 that winds around the stator core 152 and includes the coil end portions 162 that protrude from the end surfaces 152a and 152b of the stator core 152, and the coil end cover 170 that serves as a cover body that forms the cooling oil passage 172 that serves as a coolant passage around the coil end portion 162. The coil end cover 170 includes the oil drain port 170i that is provided vertically above the center axis 101 of the stator core 152 and serves as a coolant discharge portion that discharges cooling oil from the cooling oil passage 172. The motor-generator is also provided with the oil guiding rib 321 that is provided on the coil end cover 170 and serves as a guide member that guides the cooling oil discharged from the oil drain port 170i into the space 330 to the inside of the stator core 152.

According to the thus-structured motor-generator of the eighth example embodiment of the invention, the coil end portion 162 which generates a large amount of heat can be efficiently cooled by providing the coil end cover 170 for forming the cooling oil passage 172. Also, the bearings 131 and 132 are able to be efficiently cooled with a simple structure by actively leading the oil used for cooling the coil end portion 162 into the space 330 to the inside of the stator core 152.

Figure 31:
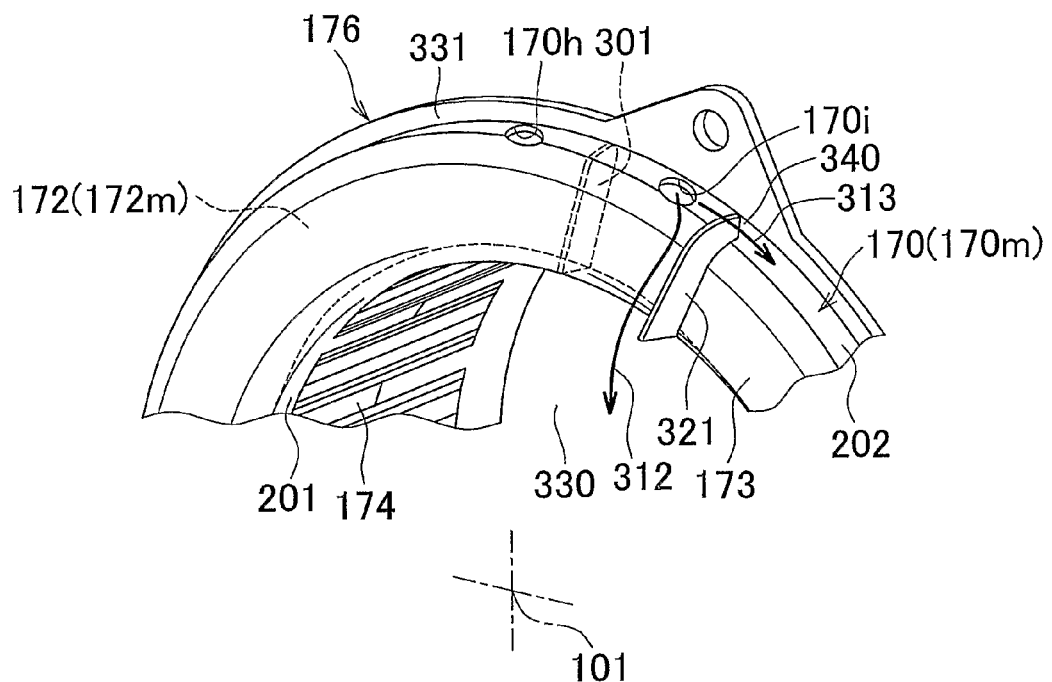
FIG. 31 is a perspective view of an oil flow control structure according to a ninth example embodiment of the invention.

FIG. 31 is a perspective view of an oil flow control structure according to a ninth example embodiment of the invention. The oil flow control structure according to this example embodiment is basically the same as the oil flow control structure according to the eighth example embodiment described above. Therefore, a description of the overlapping structure will not be repeated.

Referring to FIG. 31, the fastening ring 176 has a flange portion 331 that flares out in a flange shape centered around the central axis 101. The flange portion 331 is a portion that is fastened to the motor case 351 shown in FIG. 27.

In this example embodiment, the oil guiding rib 321 is formed so as to create a gap 340 between the oil guiding rib 321 and the flange portion 331. Some of the cooling oil discharged from the oil drain port 170i is guided to the space 330 to the inside of the stator core 152, as indicated by arrow 312, while the rest of the cooling oil travels along the surface of the annular portion 173, as indicated by arrow 313, and flows down into an oil pan provided at the bottom of the motor case 351.

This kind of structure makes it possible to prevent more oil than is necessary from being supplied to the bearings 131 and 132 shown in FIG. 27. As a result, loss due to shearing of the oil at the bearings 131 and 132 can be kept to a minimum.

The thus-structured motor-generator according to this ninth example embodiment of the invention is able to obtain the same effects as those obtained by the first example embodiment described above.

Figure 32:
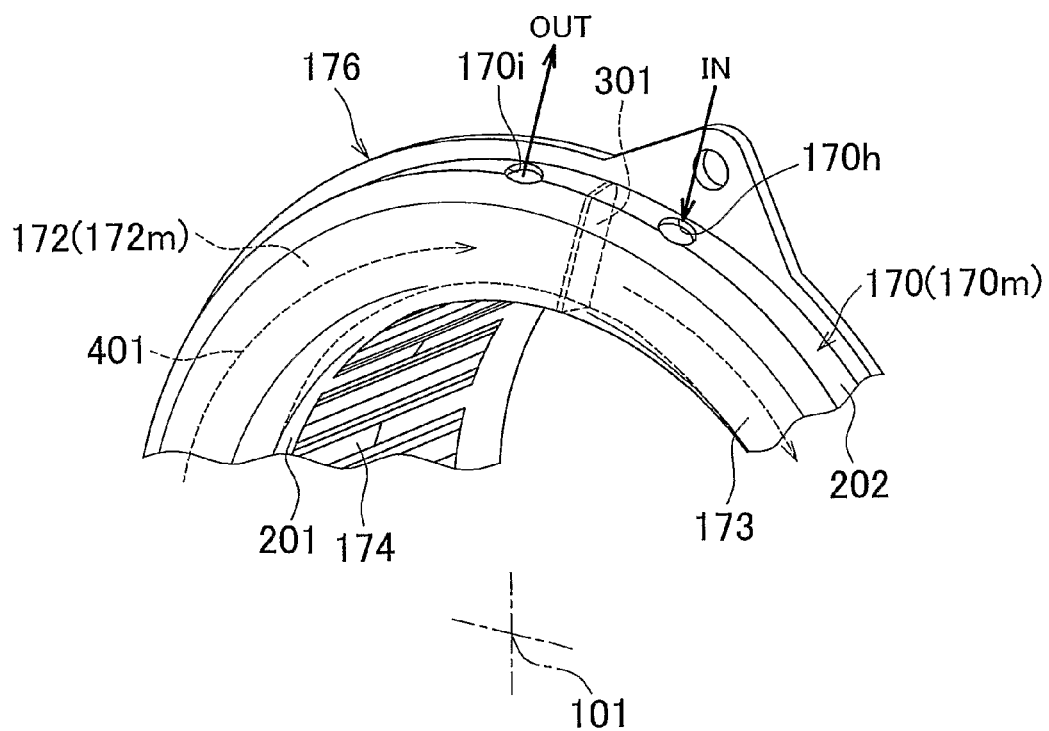
FIG. 32 is a perspective view of a motor-generator according to a tenth example embodiment of the invention.

Continuing on, the cooling structure for the radial inside of the coil provided in the motor-generator 100 shown in FIG. 1 will now be described. FIG. 32 is a perspective view of a motor-generator according to a tenth example embodiment of the invention. Referring to FIG. 32, in this example embodiment, the positions of the oil supply port 170h and the oil drain port 170i in the coil end cover 170m are switched compared with those in the motor-generator shown in FIG. 5. Therefore, oil that has been supplied to the cooling oil passage 172m through the oil supply port 170h flows in the clockwise direction as shown by arrow 401 in the drawing, and after flowing in a circle, is drained through the oil drain port 170i.

Figure 33:
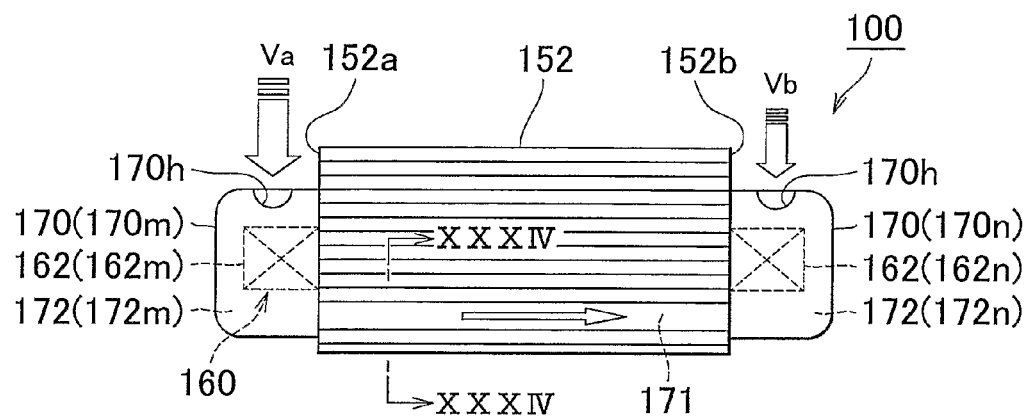
FIG. 33 is a side view of a cooling structure for the radial inside of the coil according to the tenth example embodiment of the invention.
Figure 34:
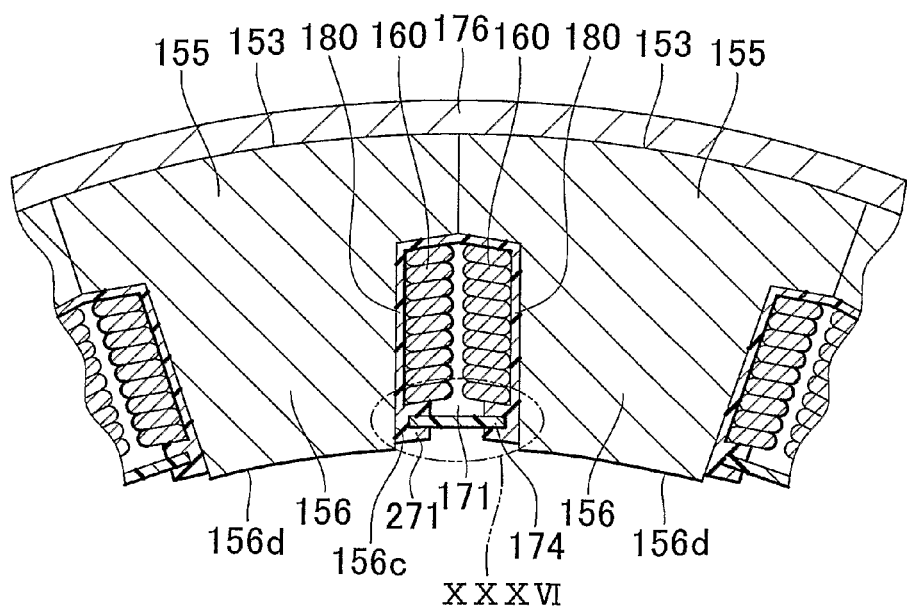
FIG. 34 is a sectional view of the stator taken along line XXXIV-XXXIV in FIG. 33.

FIG. 33 is a side view of a cooling structure for the radial inside of the coil according to the tenth example embodiment of the invention, and FIG. 34 is a sectional view of the stator taken along line XXXIV-XXXIV in FIG. 33.

Referring to FIGS. 33 and 34, the coil 160 includes a coil end portion 162m that protrudes from the end surface 152a, and a coil end portion 162n that protrudes from the end surface 152b.

A gap in which the coil 160 is arranged is formed to the inside of the elongated portion 174 of the coil end cover 170 that extends (in the slots) between adjacent teeth portions 156, and the cooling oil communicating passage 171 is formed by this gap. The cooling oil communicating passage 171 communicates the cooling oil passage 172m on the end surface 152a of the stator core 152 with the cooling oil passage 172n on the end surface 152b of the stator core 152. The cooling oil that flows through the cooling oil communicating passage 171 performs heat exchange with the coil 160 that is wound around the teeth portion 156, thereby cooling the coil 160 from the inside of the stator core 152.

In this example embodiment, the cooling oil flowrate per unit time that is supplied to the cooling oil passage 172m through the oil supply port 170h will be designated as Va, and the cooling oil flowrate per unit time that is supplied to the cooling oil passage 172n through the oil supply port 170h will be designated as Vb. In this example embodiment, the cooling oil supply flowrate is set such that Va is greater than Vb (i.e., Va>Vb). That is, the cooling oil supply flowrate Va for the cooling oil passage 172m provided with the connecting wire 168 is greater than the cooling oil supply flowrate Vb for the cooling oil passage 172n not provided with the connecting wire 168.

According to this kind of structure, the pressure of the flow of cooling oil flowing through the cooling oil passage 172m is greater than the pressure of the flow of cooling oil flowing through the cooling oil passage 172n. As a result, the flow of cooling oil from the cooling oil passage 172m toward the cooling oil passage 172n through the cooling oil communicating passage 171 is forcibly created.

Figure 35:
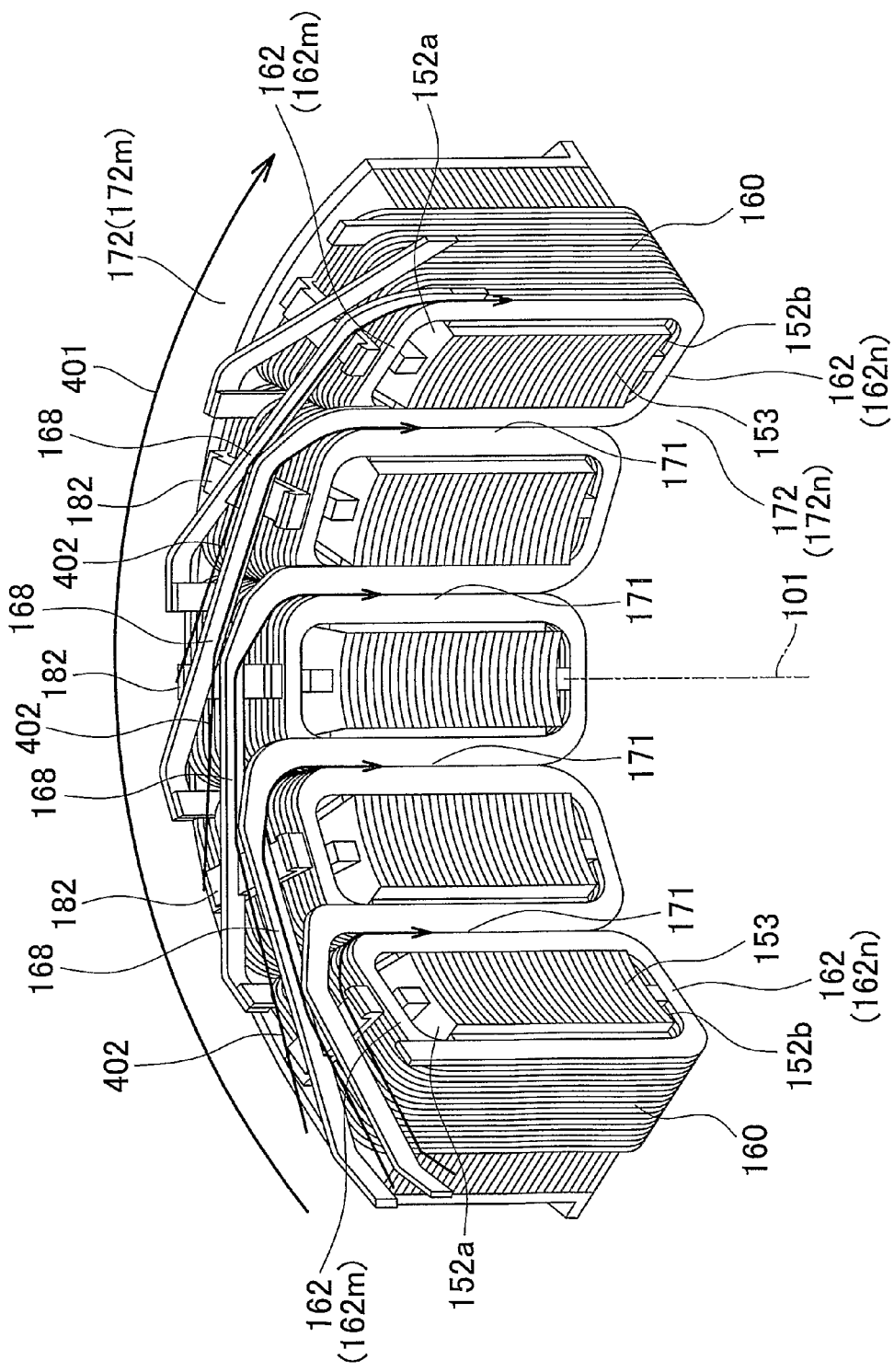
FIG. 35 is a perspective view of the inside of the coil end cover shown in FIG. 31.

FIG. 35 is a perspective view of the inside of the coil end cover shown in FIG. 31. Referring to FIG. 35, the connecting wire 168 extends from the end portion on the radial outside of a coil 160 provided in one split stator core 153 and angles inward in the radial direction of the stator core 152, where it is connected to the end portion on the radial inside of a coil 160 provided in another split stator core 153.

In this example embodiment, the connecting wire 168 extends at an angle from the radial outside to the radial inside of the stator core 152 clockwise in the circumferential direction of the stator core 152. Meanwhile, the cooling oil flows through the cooling oil passage 172*m* as described above in the clockwise direction. Therefore, the direction in which the connecting wire 168 extends angled from the radial outside to the radial inside of the stator core 152 is the same as the direction in which the cooling oil flows through the cooling oil passage 172*m*.

The cooling oil that flows through the cooling oil passage 172 passes through the space between adjacent connecting wires 168 as it is guided from the radial outside of the stator core 152 to the radial inside of the stator core 152 in the direction indicated by arrow 402. At this time, the cooling oil is able to be guided smoothly to the inside of the stator core 152 where the cooling oil communicating passage 171 is arranged using the connecting wire 168 as a guide because the direction in which the connecting wire 168 extends at an angle from the radial outside of the stator core 152 to the radial inside of the stator core 152 is the same as the direction in which the cooling oil that flows through the cooling oil passage 172*m* flows.

Also, in this example embodiment, the connecting wire 168 has a generally rectangular cross section such that if it is cut along a plane orthogonal to the direction in which it extends, the long side of the connecting wire 168 extends in the axial direction of the stator core 152 and the short side extends in the direction orthogonal to the axial direction of the stator core 152. Such a structure enables the connecting wire 168 to fully function as a guide such that even more cooling oil can be guided to the inside of the stator core 152.

The motor-generator according to this tenth example embodiment of the invention is provided with the annular stator core 152, the coil 160, the coil end cover 170 that serves as a cover body, and a plurality of connecting wires 168. The coil 160 is wound around the stator core 152 and has the coil end portion 162*m* that serves as a first coil end portion that protrudes from the end surface 152*a* of the stator core 152, and the coil end portion 162*n* that serves as a second coil end portion that protrudes from the end surface 152*b* of the stator core 152. The coil end cover 170 forms the cooling oil passage 172*m* that serves as a first coolant passage around the coil end portion 162*m*, and the cooling oil passage 172*n* that serves as a second coolant passage around the coil end portion 162*n*. Furthermore, the coil end cover 170 forms the cooling oil communicating passage 171 as a gap that communicates the cooling oil passage 172*m* with the cooling oil passage 172*n* on the inside of the stator core 152.

The plurality of connecting wires 168 are provided in the cooling oil passage 172*m*. Each of these connecting wires 168 extend at an angle from the radial outside of the stator core 152 to the radial inside of the stator core 152, when viewed from the axial direction of the stator core 152, and connects the beginning of one coil 160 to the end of another coil 160. The direction in which the cooling oil flows through the cooling oil passage 172*m* is the same as the direction in which the plurality of connecting wires 168 extends at an angle from the radial outside of the stator core 152 toward the radial inside of the stator core 152, in the circumferential direction of the stator core 152. The flowrate of cooling oil in the cooling oil passage 172*m* is set larger than the flowrate of cooling oil in the cooling oil passage 172*n*.

According to the thus-structured motor-generator in the tenth example embodiment of the invention, the synergistic effect of the structure of setting the cooling oil supply flowrate such that Va is greater than Vb (i.e., Va>Vb) and the structure of having the direction in which the connecting wire 168 extends at an angle be the same as the direction in which the cooling oil that flows through the cooling oil passage 172*m* flows enables even more cooling oil can flow through the cooling oil communicating passage 171. As a result, the radial inside of the coil 160 wound around the teeth portion 156 is able to be more efficiently cooled. In particular, when an edge width coil is used as the coil 160, copper eddy loss occurs on the radial inside of the coil due to the magnetic flux from the rotor so the radial inside of the coil 160 needs to be efficiently cooled.

Figure 36:
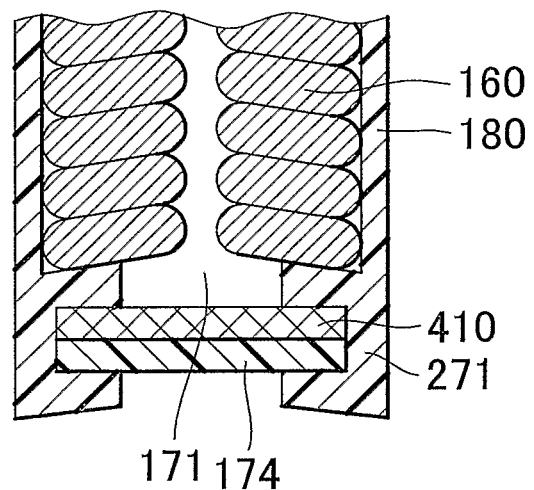
FIG. 36 is a sectional view of the cooling structure, according to a first modified example of an eleventh example embodiment of the invention, for the radial inside of the coil shown in FIG. 34.

Next, an eleventh example embodiment of the invention will be described. In this eleventh example embodiment, various modified examples of the cooling structure of the radial inside of the coil shown in FIG. 34 will be described. FIG. 36 is a sectional view of the cooling structure, according to a first modified example of the eleventh example embodiment, for the radial inside of the coil shown in FIG. 34. This drawing shows a cross section corresponding to the area encircled by the alternate long and two short dashes line XXXVI in FIG. 34.

Referring to FIG. 36, in this modified example, a mesh member 410 is affixed to the elongated portion 174 such that the inside wall of the elongated portion 174 that defines the cooling oil communicating passage 171 has a concavo-convex shape. The mesh member 410 is a member that has a mesh surface. The mesh member 410 is retained together with the elongated portion 174 by the inserting portions 271.

According to this kind of structure, the cooling oil that has flowed into the cooling oil communicating passage 171 contacts flows while contacting the mesh member 410, and as a result, turbulence is generated in the flow of cooling oil inside the cooling oil communicating passage 171, which enables the cooling efficiency of the coil 160 to be improved.

FIG. 37 is a perspective view of a coil end cover used in the cooling structure, according to a second modified example of the eleventh example embodiment, for the radial inside of the coil shown in FIG. 34, FIG. 38 is a perspective view of a coil end cover used in the cooling structure, according to a third modified example of the eleventh example embodiment, for the radial inside of the coil shown in FIG. 34, and FIG. 39 is a perspective view of a coil end cover used in the cooling structure, according to a fourth modified example of the eleventh example embodiment, for the radial inside of the coil shown in FIG. 34. These drawings show the surface of the inside of the coil end cover 170.

Referring to FIG. 37, in this modified example, the inside wall of the elongated portion 174 that is formed of resin is molded in a mesh shape. Referring to FIG. 38, in this modified example, fin-like protrusions 411 are molded on the inside wall of the elongated portion 174 that is formed of resin. These fin-like protrusions 411 are formed by protrusions that protrude in a rectangular parallelepiped shape from the surface of the inside wall of the elongated portion 174. Referring to FIG. 39, in this modified example, columnar protrusions 412 are formed on the inside wall of the elongated portion 174 that is formed from resin. These columnar protrusions 412 are formed by protrusions that protrude in a cylindrical column shape from the inside wall surface of the elongated portion 174. With these modified examples as well, turbulence is generated in the flow of cooling oil inside the cooling oil communicating passage 171, which enables the cooling efficiency of the coil 160 to be improved.

The thus-structured motor-generator according to this eleventh example embodiment of the invention is able to obtain the same effects as those obtained by the tenth example embodiment described above.

Continuing on, the cooling structure of the coil that uses the motor case 351 and is provided in the motor-generator 100 shown in FIG. 1 will be described.

FIG. 40 is a sectional view of a motor-generator according to a twelfth example embodiment of the invention. Referring to FIG. 40, in this example embodiment, narrow spaces 421 and 422 through which oil can flow are formed between the motor case 351 and the coil end cover 170. More specifically, the narrow space 421 is formed between the wall portion 352 of the motor case 351 and the coil end cover 170m, and the narrow space 422 is formed between the wall portion 353 of the motor case 351 and the coil end cover 170n. The size t of the gap of these narrow spaces 421 and 422 at the narrowest portion is within a range of 0.1 mm to 1 mm, e.g., 0.5 mm.

FIG. 41 is an enlarged sectional view of the area encircled by the alternate long and two short dashes line XLI in FIG. 40. Incidentally, in the description below, only the narrow space 421 will be described, but the narrow space 422 has the same structure.

Referring to FIGS. 40 and 41, the wall portion 352 of the motor case 351 has an inside wall 352c that faces the coil end cover 170 across the narrow space 421, and the coil end cover 170m has an inside wall 170c that faces the wall portion 352 of the motor case 351 across the narrow space 421. In this example embodiment, the inside wall 352c and the inside wall 170c are formed in a concavo-convex shape. The motor case 351 and the coil end cover 170m are arranged close together such that the concavo-convex shapes molded on the inner wall 352c and the inside wall 170c overlap each other.

Incidentally, in the drawing, both the inside wall 352c and the inside wall 170c are molded in concavo-convex shapes. Alternatively, however, the concavo-convex shape may be molded on only the inside wall 352c ore only the inside wall 170c.

FIG. 42 is a perspective view of the coil end cover shown in FIG. 41 according to a first modified example of the twelfth example embodiment, and FIG. 43 is a perspective view of the coil end cover shown in FIG. 41 according to a second modified example of the twelfth example embodiment.

Referring to FIG. 42, in this modified example, a mesh-like component 431 is affixed to the inside wall 170c of the coil end cover 170. This mesh-like component 431 is formed by punching metal, for example. Referring to FIG. 43, in this modified example, protrusions 432 are molded on the inside wall 170c of the coil end cover 170 that is formed of resin. These protrusions 432 are formed by protrusions that protrude in a cylindrical column shape from the surface of the inside wall 170c.

Referring to FIG. 40, the cooling oil that has been discharged from the cooling oil passage 172 through the oil drain port 170i of the coil end cover 170 passes between the coil end cover 170 and the motor case 351 and runs down to the bottom of the motor case 351. At this time, in this example embodiment, the narrow spaces 421 and 422 that are formed from very narrow gaps are formed between the coil end cover 170 and the motor case 351, so the oil is able to be retained longer in those narrow spaces 421 and 422.

Also, in this example embodiment, the inside wall 352c and the inside wall 170c are molded in concavo-convex shapes. As a result, the contact area between the cooling oil that flows through the narrow spaces 421 and 422 and the inside wall 352c and the inside wall 170c is increased while turbulence is able to be generated in the flow of cooling oil in those narrow spaces 421 and 422.

The motor-generator according to this twelfth example embodiment of the invention is provided with the stator core 152, the coil 160, the coil end cover 170 that serves as a cover body, and the motor case 351 that serves as a case body that houses the stator core 152. The coil 160 is wound around the stator core 152 and includes the coil end portions 162 that protrude from the end surfaces 152a and 152b of the stator core 152. The coil end cover 170 forms the cooling oil passages 172 that serve as the coolant passages around the coil end portions 162. The coil end cover 170 includes an oil drain port 170i that serves as a coolant discharge portion for discharging cooling oil from the cooling oil passages 172. The motor case 351 is arranged to form the narrow spaces 421 and 422 through which cooling oil can flow, between the motor case 351 and the coil end cover 170. The wall surface of at least one of the motor case 351 or the coil end cover 170 that define the narrow spaces 421 and 422 has a concavo-convex shape.

According to the thus-structured motor-generator in this twelfth example embodiment, the efficiency of heat conduction from the coil end cover 170 to the motor case 351, which is performed via the cooling oil that flows through the narrow spaces 421 and 422, is able to be improved. As a result, the coil end portions 162 that are arranged inside the coil end cover 170 can be efficiently cooled.

Also, the temperatures of the motor case 351 and the coil end cover 170 are typically lower than the oil temperature because they are cooled by the water jacket as well as by the air that strikes the hybrid vehicle as it travels (i.e., the so-called running air of the hybrid vehicle), and the like. Therefore, the oil that contacts the motor case 351 and the coil end cover 170 in these narrow spaces 421 and 422 is cooler than when it is discharged from the oil drain port 170i, and is returned to the oil pan at the bottom of the motor case 351. As a result, the temperature of the oil supplied into the coil end cover 170 again is lower, which enables the coil end portions 162 to be cooled even more efficiently.

Although various structures provided in the motor-generator 100 shown in FIG. 1 have been described, a new motor-generator may also be structure by appropriately combining the structures described in the first to twelfth example embodiments.

The example embodiments disclosed, herein are in all respects merely examples and should in no way be construed as limiting. The scope of the invention is indicated not by the foregoing description but by the scope of the claims for patent, and is intended to include all modifications that are within the scope and meanings equivalent to the scope of the claims for patent.

The invention claimed is:

1. A rotating electrical machine comprising:
   an annular stator core;
   a coil that is wound around the stator core and includes a first coil end portion that protrudes from one end surface of the stator core and a second coil end portion that protrudes from another end surface of the stator core;
   a first coolant passage that is a coolant passage formed around the first coil end portion;
   a first coolant supply port provided in the first coolant passage;
   a second coolant passage that is a coolant passage formed around the second coil end portion;
   a second coolant supply port provided in the second coolant passage;
   a cover body formed by a pair of coil end covers, each one of the coil end covers having a projection extending in an axial direction of the stator core, which forms a gap that communicates the first coolant passage with the second coolant passage on the an inside of the stator core; and a plurality of connecting wires that are provided in the first coolant passage, each of the connecting wires extending at an angle from a radial outside of the stator core to a radial inside of the stator core, when viewed from the axial direction of the stator core, and connecting a beginning of the coil to an end of the coil, wherein a direction in which coolant flows through the first coolant passage is the same as a direction in which the plurality of connecting wires extend at the angle from the radial outside of the stator core toward the radial inside of the stator core, in a circumferential direction of the stator core, and a flowrate of coolant in the first coolant passage is set larger than a flowrate of coolant in the second coolant passage so as to create a pressure difference between the first coolant passage and the second coolant passage which causes the coolant to flow into the gap.

2. The rotating electrical machine according to claim 1, wherein a wall surface of the cover body that defines the gap has a concavo-convex shape.

3. The rotating electrical machine according to claim 2, wherein the cover body is formed of resin and has the concavo-convex shape molded on the wall surface.

4. The rotating electrical machine according to claim 1, wherein a mesh member is arranged on a wall surface of the cover body that defines the gap.

5. The rotating electrical machine according to claim 4, wherein the cover body is formed of resin and has a mesh shape molded on the wall surface.

6. The rotating electrical machine according to claim 1, wherein each of the connecting wires has a generally rectangular cross section such that if cut along a plane orthogonal to the direction in which the connecting wire extends, a long side of the cross section of the connecting wire extends in the axial direction of the stator core and a short side of the cross section of the connecting wire extends in the direction orthogonal to the axial direction of the stator core.

* * * * *